US012566962B2

(12) United States Patent
Annau et al.

(10) Patent No.: US 12,566,962 B2
(45) Date of Patent: Mar. 3, 2026

(54) DITHERED QUANTIZATION OF PARAMETERS DURING TRAINING WITH A MACHINE LEARNING TOOL

(71) Applicant: Microsoft Technology Licensing, LLC, Redmond, WA (US)

(72) Inventors: Thomas M. Annau, San Carlos, CA (US); Haishan Zhu, Redmond, WA (US); Daniel Lo, Bothell, WA (US); Eric S. Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 16/240,514

(22) Filed: Jan. 4, 2019

(65) Prior Publication Data

US 2020/0218982 A1    Jul. 9, 2020

(51) Int. Cl.
*G06N 3/084* (2023.01)
*G06F 7/499* (2006.01)
*G06N 20/00* (2019.01)

(52) U.S. Cl.
CPC ......... *G06N 3/084* (2013.01); *G06F 7/49963* (2013.01); *G06N 20/00* (2019.01)

(58) Field of Classification Search
CPC .......... G06N 3/084; G06N 7/02; G06N 20/00; G06N 3/00; G06N 5/00; G06N 7/00; G06N 10/00; G06N 99/00
See application file for complete search history.

(56) References Cited

U.S. PATENT DOCUMENTS

| | | | |
|---|---|---|---|
| 6,144,977 A | 11/2000 | Giangarra et al. | |
| 10,167,800 B1 | 1/2019 | Chung et al. | |
| 2014/0289445 A1 | 9/2014 | Savich | |
| 2016/0328646 A1 | 11/2016 | Lin et al. | |
| 2018/0107926 A1 | 4/2018 | Choi et al. | |
| 2018/0157465 A1 | 6/2018 | Bittner et al. | |
| 2019/0347554 A1* | 11/2019 | Choi ........................ | G06N 3/04 |
| 2020/0242466 A1* | 7/2020 | Mohassel ................ | H04L 9/008 |

OTHER PUBLICATIONS

Yoojin Choi and Mostafa El-Khamy and Jungwon Lee (2018). Compression of Deep Convolutional Neural Networks under Joint Sparsity Constraints. CoRR, abs/1805.08303. (Year: 2018).*

(Continued)

*Primary Examiner* — Kakali Chaki
*Assistant Examiner* — Johnathan R Germick
(74) *Attorney, Agent, or Firm* — Klarquist Sparkman, LLP

(57)    ABSTRACT

A machine learning tool uses dithered quantization of parameters during training of a machine learning model such as a neural network. The machine learning tool receives training data and initializes certain parameters of the machine learning model (e.g., weights for connections between nodes of a neural network, biases for nodes). The machine learning tool trains the parameters in one or more iterations based on the training data. In particular, in a given iteration, the machine learning tool applies the machine learning model to at least some of the training data and, based at least in part on the results, determines parameter updates to the parameters. The machine learning tool updates the parameters using the parameter updates and a dithered quantizer function, which can add random values before a rounding or truncation operation.

20 Claims, 5 Drawing Sheets

<u>501</u>

(56)　　　　　References Cited

OTHER PUBLICATIONS

K. Ando, K. Ueyoshi, Y. Oba, K. Hirose, R. Uematsu, T. Kudo, M. Ikebe, T. Asai, S. Takamaeda-Yamazaki, & M. Motomura (2018). Dither NN: An Accurate Neural Network with Dithering for Low Bit-Precision Hardware. In 2018 International Conference on Field-Programmable Technology (FPT) (pp. 6-13). (Year: 2018).*
Andrew J. R. Simpson (2015). Taming the ReLU with Parallel Dither in a Deep Neural Network. CoRR, abs/1509.05173. (Year: 2015).*
I. Boybat et al., "Improved Deep Neural Network Hardware-Accelerators Based on Non-Volatile-Memory: The Local Gains Technique," 2017 IEEE International Conference on Rebooting Computing (ICRC), Washington, DC, 2017, pp. 1-8, doi: 10.1109/ICRC.2017.8123642. (Year: 2017).*
Yi-Te Hsu, Yu-Chen Lin, Szu-Wei Fu, Yu Tsao, & Tei-Wei Kuo. (2018). A study on speech enhancement using exponent-only floating point quantized neural network (EOFP-QNN). (Year: 2018).*
Julian Faraone and Nicholas J. Fraser and Michaela Blott and Philip Heng Wai Leong (2018). SYQ: Learning Symmetric Quantization For Efficient Deep Neural Networks. CoRR, abs/1807.00301. p. 1-10 (Year: 2018).*
R. M. Gray and T. G. Stockham, "Dithered quantizers," in IEEE Transactions on Information Theory, vol. 39, No. 3, May 1993, doi: 10.1109/18.256489. p. 1-8 (Year: 1993).*
Aldrich, N. (2005). Exploring Dither in Floating-Point Systems. Researchgate.net (Year: 2005).*
Alistarh, D., Grubic, D., Li, J., Tomioka, R., & Vojnovic, M. (2017). QSGD: Communication-Efficient SGD via Gradient Quantization and Encoding. In Advances in Neural Information Processing Systems. Curran Associates, Inc.. (Year: 2017).*
Zhang, D., Yang, J., Ye, D., & Hua, G.. (2018). LQ-Nets: Learned Quantization for Highly Accurate and Compact Deep Neural Networks. (Year: 2018).*
Hubara, I., Courbariaux, M., Soudry, D., El-Yaniv, R., & Bengio, Y.. (2016). Quantized Neural Networks: Training Neural Networks with Low Precision Weights and Activations. (Year: 2016).*
Katarzyna Janocha, & Wojciech Marian Czarnecki. (2017). On Loss Functions for Deep Neural Networks in Classification. (Year: 2017).*
Hao Li, Soham De, Zheng Xu, Christoph Studer, Hanan Samet, & Tom Goldstein. (2017). Training Quantized Nets: A Deeper Understanding. (Year: 2017).*
Kevin Kepp "Quantized Back Propagation for Efficient Deep Learning" Oct. 19, 2018 Master's Thesis, The Fraunhofer Institute for Telecommunications, URL: https://www.kevinkepp.de/assets/docs/masters-thesis.pdf (Year: 2018).*
Andrew Ng "CS294A Lecture notes : Sparse autoencoder" CS294A/CS294W Deep Learning and Unsupervised Feature Learning, Winter 2011, Undergraduate class (Year: 2011).*
Maclin, Richard & Shavlik, Jude. (1999). Combining the Predictions of Multiple Classifiers: Using Competitive Learning to Initialize Neural Networks. (Year: 1999).*
Ando et al., "Dither NN: An Accurate Neural Network with Dithering for Low Bit-Precision Hardware," *Int'l Conf. on Field-Programmable Technology*, pp. 6-13 (Dec. 2018).
Choi et al., "Compression of Deep Convolutional Neural Networks under Joint Sparsity Constraints," arXiv:1805.08303v2, 16 pp. (May 2018).
International Search Report and Written Opinion dated Apr. 20, 2020, from International Patent Application No. PCT/US2019/067303, 15 pp.
Anonymous, Artificial Intelligence Index 2017 Annual Report, Nov. 2017, 101 pages.
Baydin et al., "Automatic Differentiation in Machine Learning: a Survey," Journal of Machine Learning Research 18 (2018), Feb. 5, 2018, 43 pages (also published as arXiv:1502.05767v4 [cs.SC] Feb. 5, 2018).
Bulò et al., "In-Place Activated BatchNorm for Memory-Optimized Training of DNNs," 2018 IEEE/CVF Conference on Computer Vision and Pattern Recognition, Jun. 2018, pp. 5639-5647 (also published as arXiv:1712.02616 [cs.CV]).
Burger, "Accelerating Persistent Neural Networks at Datacenter Scale," Microsoft Corporation, 52 pp. accessed Apr. 18, 2018, available at: https://www.microsoft.com/en-us/research/blog/microsoft-unveils-project-brainwave/.
Burger, "Microsoft Unveils Project Brainwave for Real-Time AI," Microsoft Corporation, 3 pp (Aug. 18, 2018).
Chen et al., "Compressing Neural Networks with the Hashing Trick," In International Conference on Machine Learning, pp. 2285-2294, 2015 (also cited as arXiv:1504.04788v1 [cs.LG] Apr. 19, 2015).
Chiu et al., State-of-the-art Speech Recognition with Sequence-to-Sequence Models. CoRR, abs/1712.01769, 2017 (also cited as arXiv:1712.01769v6 [cs.CL] Feb. 23, 2018).
Chung et al., "Serving DNNs in Real Time at Datacenter Scale with Project Brainwave," IEEE Micro Pre-Print, 11 pages accessed Apr. 4, 2018, available at https://www.microsoft.com/en-us/research/uploads/prod/2018/03/mi0218_Chung-2018Mar25.pdf, also published as "Serving DNNs in Real Time at Datacenter Scale with Project Brainwave," IEEE Micro, vol. 38, Issue 2, Mar./Apr. 2018.
Colah, "Understanding LSTM Networks," posted on Aug. 27, 2015, 13 pages.
Courbariaux et al., "Low precision arithmetic for deep learning," also available as arXiv:1412.7024v1, Dec. 2014.
Courbariaux et al., "Binarized Neural Networks: Training Neural Networks with Weights and Activations Constrained to +1 or −1," arXiv preprint arXiv:1602.02830v3, Mar. 2016, 11 pages.
Courbariaux et al., "Binaryconnect: Training Deep Neural Networks with Binary Weights During Propagations," In Proceedings of the 28th International Conference on Neural Information Processing Systems, vol. 2, Dec. 2015, 9 pages.
Courbariaux et al., "Training Deep Neural Networks with Low Precision Multiplications," Sep. 23, 2015, 10 pages.
CS231n Convolutional Neural Networks for Visual Recognition, downloaded from cs231n.github.io/optimization-2, Dec. 20, 2018, 9 pages.
Denil et al., Predicting Parameters in Deep Learning, In Advances in Neural Information Processing Systems, Dec. 2013, pp. 2148-2156.
Dunay et al., "Dithering for Floating-Point Number Representation," 1st International On-Line Workshop on Dithering in Measurement, 12 pp. (1998).
Elam et al., "A Block Floating Point Implementation for an N-Point FFT on the TMS320C55x DSP," Texas Instruments Application Report SPRA948, Sep. 2003, 13 pages.
"FFT/IFFT Block Floating Point Scaling," Altera Corporation Application Note 404, Oct. 2005, ver. 1.0, 7 pages.
Goodfellow et al., "Deep Learning," downloaded from http://www.deeplearningbook.org/ on May 2, 2018, (document dated 2016), 766 pages.
Gomez, "Backpropogating an LSTM: A Numerical Example," Apr. 18, 2016, downloaded from medium.com/@aidangomez/let-s-do-this-f9b699de31d9, Dec. 20, 2018, 8 pages.
Gupta et al., "Deep Learning with Limited Numerical Precision," Feb. 9, 2015, 10 pages.
Han et al., "Deep Compression: Compressing Deep Neural Networks with Pruning, Trained Quantization and Huffman Coding," arXiv preprint arXiv:1510.00149v5 [cs:CV], Feb. 15, 2016, 14 pages.
Hassan et al., "Achieving Human Parity on Automatic Chinese to English News Translation," CoRR, abs/1803.05567, 2018 (also published as arXiv:1803.05567v2 [cs.CL] Jun. 29, 2018).
He et al., "Deep Residual Learning for Image Recognition," arXiv preprint arXiv:1512.03385v1 [cs.CV] Dec. 10, 2015.
Ioffe et al., "Batch Normalization: Accelerating Deep Network Training by Reducing Internal Covariate Shift," arXiv:1502.03167v3 [cs.LG], Mar. 2015, 11 pages.
Jain et al., "Gist: Efficient Data Encoding for Deep Neural Network Training," 2018 ACM/IEEE 45th Annual International Symposium on Computer Architecture, Jun. 2018, 14 pages.

(56) References Cited

OTHER PUBLICATIONS

Karl N's Blog., "Batch Normalization—What the hey?," Posted on Jun. 7, 2016, downloaded from gab41.lab41.org/batch-normalization-what-the-hey-d480039a9e3b, Jan. 9, 2019, 7 pages.

Kevin's Blog, "Deriving the Gradient for the Backward Pass of Batch Normalization," Posted on Sep. 14, 2016, downloaded from kevinzakka.github.io/2016/09/14/batch_normalization/, Jan. 9, 2019, 7 pages.

Köster et al., "Flexpoint: An Adaptive Numerical Format for Efficient Training of Deep Neural Networks," In Advances in Neural Information Processing Systems, pp. 1742-1752, 2017 (also published as arXiv:1711.02213v2 [cs:LG] Dec. 2, 2017).

Kratzert's Blog, "Understanding the backward pass through Batch Normalization Layer," Posted on Feb. 12, 2016, downloaded from kratzert.github.io/2016/02/12/understanding-the-gradient-flow-through-the-bathch-nor . . . on Jan. 9, 2019, 17 pages.

Langhammer et al., "Floating-Point DSP Block Architecture for FPGAs," Proceedings of the 2015 ACM/SIGDA International Symposium on Field-Programmable Gate Arrays, Feb. 2015, pp. 117-125.

Le et al., "Neural Architecture Search with Reinforcement Learning," PowerPoint presentation, 37 pages.

Le, "A Tutorial on Deep Learning, Part 1: Nonlinear Classifiers and the Backpropagation Algorithm," Dec. 2015, 18 pages.

Le, "A Tutorial on Deep Learning, Part 2: Autoencoders, Convolutional Neural Networks and Recurrent Neural Networks," Oct. 2015, 20 pages.

Lecun et al., "Optimal Brain Damage," In Advances in Neural Information Processing Systems, Nov. 1989, pp. 598-605.

Li et al., "Stochastic Modified Equations and Adaptive Stochastic Gradient Algorithms," Proceedings of the 34th International Conference on Machine Learning, PMLR 70, 2017, 10 pages.

Li et al., "Ternary eight networks," arXiv preprint arXiv:1605.04711v2 [cs:CV] Nov. 19, 2016.

Lin et al., "Fixed Point Quantization of Deep Convolutional Networks," In International Conference on Machine Learning, pp. 2849-2858, 2016 (also published as arXiv:1511.06393v3 [cs:LG] Jun. 2, 2016).

Liu, "DARTS: Differentiable Architecture Search," arXiv:1806.09055v1 [cs.LG], Jun. 24, 2018, 12 pages.

Mellempudi et al., "Ternary Neural Networks with Fine-Grained Quantization," May 2017, 11 pages.

Mendis et al., "Helium: Lifting High-Performance Stencil Kernals from Stripped x86 Binaries to Halide DSL Code," Proceedings of the 36th ACM SIGPLAN Conference on Programming Languate Design and Implementation, Jun. 2015, pp. 391-402.

Mishra et al., "Apprentice: Using Knowledge Distillation Techniques to Improve Low-Precision Network Accuracy," arXiv preprint arXiv:1711.05852v1 [cs:LG] Nov. 15, 2017.

Muller et al., "Handbook of Floating-Point Arithmetic," Birkhäuser Boston (New York 2010), 78 pages including pp. 269-320.

Nielsen, "Neural Networks and Deep Learning," downloaded from http://neuralnetworksanddeeplearning.com/index.html on May 2, 2018, document dated Dec. 2017, 314 pages.

Nvidia. Nvidia tensorrt optimizer, https://developer.nvidia.com/tensorrt downloaded on Mar. 4, 2019, 9 pages.

Page, "Neural Networks and Deep Learning," www.cs.wise.edu/~dpage/cs760/, 73 pp.

Park et al., "Energy-efficient Neural Network Accelerator Based on Outlier-aware Low-precision Computation," 2018 ACM/IEEE 4th Annual International Symposium on Computer Architecture, Jun. 2018, pp. 688-698.

Rajagopal et al., "Synthesizing a Protocol Converter from Executable Protocol Traces," IEEE Transactions on Computers, vol. 40, No. 4, Apr. 1991, pp. 487-499.

Rajpurkar et al., "SQuAD: 100,000+ Questions for Machine Comprehension of Text," Proceedings of the 2016 Conference on Empirical Methods in Natural Language Processing, Nov. 2016, pp. 2383-2392.

Rastegari et al., "XNOR-Net: ImageNet Classification Using Binary Convolutional Neural Networks," In Proceedings of 14th Annual European Conference on Computer Vision, pp. 525-542. Oct. 2016.

"Russakovsky et al., ""ImageNet Large Scale Visual Recognition Challenge,"" International Journal of Computer Vision (IJCV), vol. 115, Issue 3, Dec. 2015, pp. 211-252 (also published as zrXiv:1409.0575v3 [cs.CV] Jan. 30, 2015)."

Russinovich, "Inside the Microsoft FPGA-based Configurable Cloud," Microsoft Corporation, https://channel9.msdn.com/Events/Build/2017/B8063, 8 pp. (May 8, 2017).

Russinovich, "Inside the Microsoft FPGA-based Configurable Cloud," Microsoft Corporation, Powerpoint Presentation; 41 pp. (May 8, 2017).

Smith et al., "A Bayesian Perspective on Generalization and Stochastic Gradient Descent," 6th International Conference on Learning Representations, Apr.-May 2018, 13 pages.

Szegedy et al., "Inception-v4, Inception-ResNet and the Impact of Residual Connections on Learning," arXiv:1602.07261v2, Aug. 23, 2016, 12 pages.

Szegedy et al., "Rethinking the Inception Architecture for Computer Vision," arXiv:1512.00567v3 [cs.CV] Dec. 11, 2015, 10 pages.

Tensorflow-slim image classification model library. https://github.com/tensorflow/models/tree/master/research/slim, downloaded on Mar. 4, 2019, 8 pages.

TITU1994 Blog, "Neural Architecture Search with Controller RNN," downloaded from github.com/titu1994/neural-architecture-search on Jan. 9, 2019, 3 pages.

Vanhoucke et al., "Improving the speed of neural networks on CPUs," In Deep Learning and Unsupervised Feature Learning Workshop, Dec. 2011, 8 pages.

Vucha et al., "Design and FPGA Implementation of Systolic Array Architecture for Matrix Multiplication," International Journal of Computer Applications, vol. 26, No. 3, Jul. 2011, 5 pages.

Weinberger et al., "Feature Hashing for Large Scale Multitask Learning," In Proceedings of the 26th Annual International Conference on Machine Learning, Jun. 2009, 8 pages.

Wen et al., "Learning Structured Sparsity in Deep Neural Networks," In Advances in Neural Information Processing Systems, Dec. 2016, pp. 2074-2082 (also published as arXiv:1608.036654v4 [cs.NE] Oct. 18, 2016).

Wikipedia, "Dither," 9 pages (document dated Jan. 2, 2019).

Wilkinson, "Rounding Errors in Algebraic Processes," Notes on Applied Science No. 32, Department of Scientific and Industrial Research, National Physical Laboratory (United Kingdom) (London 1963), 50 p. including pp. 26-33, 79-91, and 122-139.

Wired, "Microsoft's Internet Business Gets a New Kind of Processor," 11 pp. Apr. 19, 2018, available at: https://www.wired.com/2016/09/microsoft-bets-future-chip-reprogram-fly/.

Xiong et al., "Achieving Human Parity in Conversational Speech Recognition," arXiv:1610.05256v2 [cs:CL] Feb. 17, 2017, 13 pages.

Yeh, "Deriving Batch-Norm Backprop Equations," downloaded from chrisyeh96.github.io/2017/08/28/deriving-batchnorm-backprop on Dec. 20, 2018, 5 pages.

Zhou et al., "DoReFa-net: Training Low Bitwidth Convolutional Neural Networks with Low Bitwidth Gradients," arXiv:1606.06160v3 [cs.NE] Feb. 2, 2018, 13 pages.

Zoph et al., "Learning Transferable Architectures for Scalable Image Recognition," arXiv.1707.07012v1, Jul. 2017, 14 pages.

Zoph et al., "Neural Architecture Search with Reinforcement Learning," 5th International Conference on Learning Representations, Apr. 2017, 16 pages.

Communication pursuant to Rules 161(1) and 162 EPC dated Aug. 11, 2021, from European Patent Application No. 19839308.4, 3 pp.

Communication pursuant to Article 94(3) Received in European Patent Application No. 19839308.4 (MS# 405473-EP01-PCT), mailed on Jul. 23, 2024, 7 pages.

Decision to refuse Received for European Application No. 19839308.4, (MS#405473-EP01-PCT), mailed on Jul. 28, 2025, 16 pages.

* cited by examiner software 180 implementing a machine learning tool that uses
dithered quantization of parameters during training

Figures 5A, 5B:
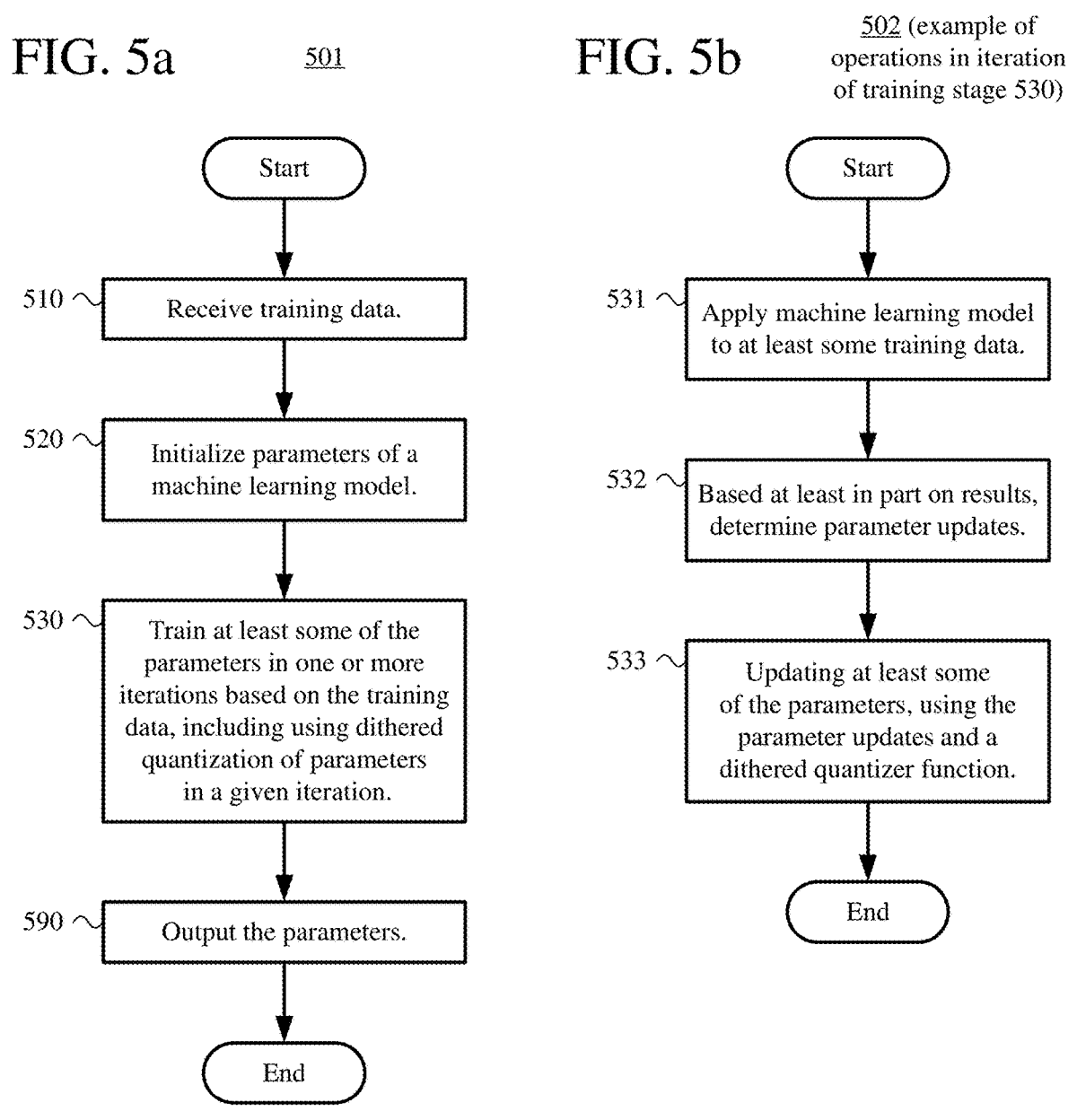

Start

510 — Receive training data.

520 — Initialize parameters of a machine learning model.

530 — Train at least some of the parameters in one or more iterations based on the training data, including using dithered quantization of parameters in a given iteration.

590 — Output the parameters.

End

FIG. 5b    502 (example of operations in iteration of training stage 530)

Start

531 — Apply machine learning model to at least some training data.

532 — Based at least in part on results, determine parameter updates.

533 — Updating at least some of the parameters, using the parameter updates and a dithered quantizer function.

End

FIG. 5c 503 (example of operations of training stage 530)

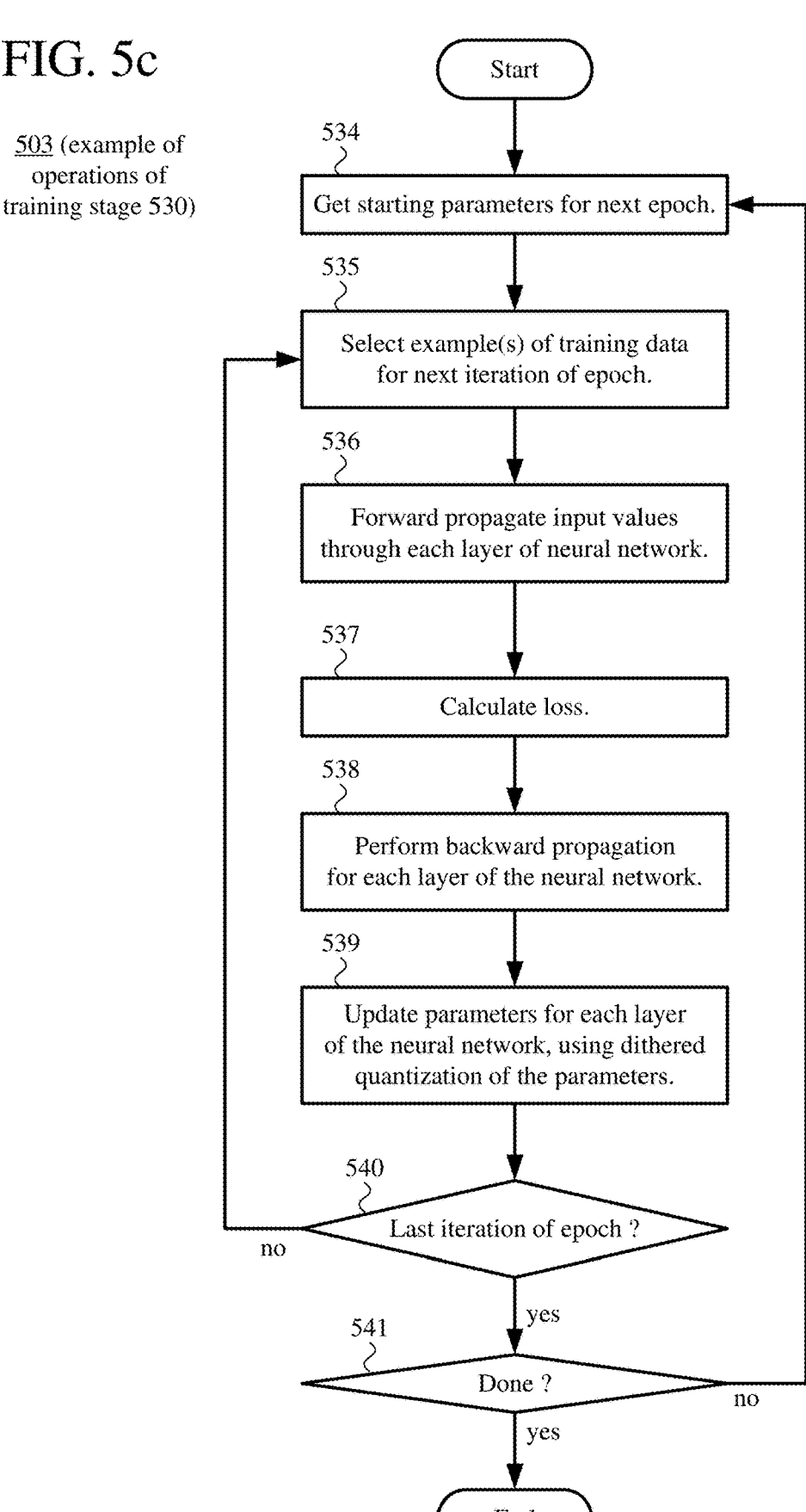

Start

534 Get starting parameters for next epoch.

535 Select example(s) of training data for next iteration of epoch.

536 Forward propagate input values through each layer of neural network.

537 Calculate loss.

538 Perform backward propagation for each layer of the neural network.

539 Update parameters for each layer of the neural network, using dithered quantization of the parameters.

540 Last iteration of epoch ?

no

541 Done ?

yes no

End

DITHERED QUANTIZATION OF PARAMETERS DURING TRAINING WITH A MACHINE LEARNING TOOL

BACKGROUND

In a computer system, machine learning uses statistical techniques to extract features from a set of training data. The extracted features can then be applied when classifying new data. Machine learning techniques can be useful in a large number of usage scenarios, such as recognizing images and speech, analyzing and classifying information, and performing various other classification tasks. For example, features can be extracted by training an artificial neural network, which may be a deep neural network with multiple hidden layers of nodes. After the deep neural network is trained, new data can be classified according to the trained deep neural network. Aside from deep neural networks, there are many other types of machine learning models used in different contexts.

Machine learning tools often execute on general-purpose processors in a computer system, such as a central processing unit ("CPU") or general-purpose graphics processing unit ("GPU"). Training operations can be so computationally expensive, however, that training is impractical for machine learning models that are large and/or complicated. Even when training is performed using special-purpose computer hardware, training can be time-consuming and resource-intensive. Reducing the computational complexity of training operations for machine learning models can potentially save time and reduce energy consumption during training. Accordingly, there is ample room for improvement in computer hardware and software to train deep neural networks and other machine learning models.

SUMMARY

In summary, the detailed description presents innovations in training with machine learning tools. For example, a machine learning tool uses dithered quantization of parameters during training of a machine learning model. In many cases, applying dithering during quantization of parameters can improve performance. For example, applying dithering during quantization of parameters can help reduce memory utilization during training a machine learning model, by enabling use of a lower-precision format to represent the parameters. Or, applying dithering during quantization of parameters can improve performance by reducing the time a machine learning tool takes to determine parameters during training, which potentially saves time and computing resources. Or, applying dithering during quantization of parameters can allow a machine learning tool to find parameters during training that more accurately classify examples during subsequent inference operations.

According to a first set of innovations described herein, a machine learning tool trains a machine learning model. For example, the machine learning model is a deep neural network. Alternatively, the machine learning model is another type of neural network, a support vector machine, a Bayesian network, a decision tree, a linear classifier, or other type of machine learning model that uses supervised learning.

The machine learning tool receives training data. In general, the training data includes multiple examples. Each of the examples has one or more attributes and a label. The training can proceed in one or more complete passes (epochs) through training data. For each epoch, the machine learning tool can select, from any remaining examples in the training data, a single example or multiple examples (mini-batch) for processing in an iteration.

The machine learning tool initializes parameters of the machine learning model. For example, the parameters include weights for connections between nodes of a neural network having multiple layers and further include biases for at least some of the nodes of the neural network. The parameters can include other and/or additional parameters for the neural network (e.g., hyper-parameters such as a count of layers in the neural network and counts of nodes for the respective layers). For another type of machine learning model, the parameters include values appropriate for the type of machine learning model. In some example implementations, the parameters are in a lower-precision format during at least some training operations. Alternatively, the parameters can be in a regular-precision format throughout training.

The machine learning tool trains at least some of the parameters in one or more iterations based on the training data. In particular, in a given iteration, the machine learning tool applies the machine learning model to at least some of the training data and, based at least in part on the results, determines parameter updates to the at least some of the parameters. For example, when the machine learning model is a neural network, the machine learning tool forward propagates input values for the given iteration through multiple layers of the neural network, calculates a measure of loss based on output of the neural network after the forward propagation and expected output for the at least some of the training data, and backward propagates the measure of loss through the multiple layers of the neural network. The parameter updates can incorporate scaling by a learning rate, which controls how aggressively parameters are updated.

The machine learning tool updates at least some of the parameters, using the parameter updates and a dithered quantizer function, which dithers quantization of parameters. For example, the machine learning tool calculates final parameters $w_{t+1}$ for a given iteration t based upon starting parameters $w_t$ for the given iteration t and parameter updates $\Delta w_t$ in the given iteration t, as $w_{t+1}=\text{dither}(w_t+\Delta w_t)$, where dither( ) is the dithered quantizer function. The machine learning tool can determine dithering values d associated with the parameters $w_t$, respectively. The dithered quantizer function can be implemented as $\text{round}(w_t+\Delta w_t+d)$, where round( ) is a rounding function, or $\text{round}((w_t+\Delta w_t+d)/p)\times p$, where p is a level of precision. Or, the dithered quantizer function can be implemented as $\text{floor}(w_t+\Delta w_t+d)$, where floor( ) is a floor function, or $\text{floor}((w_t+\Delta w_t+d)/p)\times p$, where p is a level of precision. Or, more generally, the dithered quantizer function can be implemented as $\text{quant}(w_t+\Delta w_t+d)$, where quant( ) is a quantizer function. In some example implementations, the parameter updates $\Delta w_t$ incorporate scaling by a learning rate. For example, after the machine learning tool initially determines (unscaled) parameter updates $\Delta w'_t$ for the given iteration t, the parameter updates $\Delta w'_t$ are multiplied (scaled) by the learning rate $\eta$, as $\Delta w_t=\eta\times\Delta w'_t$.

In general, the dithering values d are based at least in part on output of a random number generator, and include random values having certain characteristics. In some example implementations, the dithering values d are random values having the power spectrum of white noise. Alternatively, the dithering values d can be random values having the power spectrum of blue noise or some other power spectrum. The dithering values d can be "memory-less"

(independently determined for each value). Alternatively, the dithering values d can be influenced by memory of previous quantization error (e.g., using feedback through error diffusion). The dithered quantizer function can be applied in all iterations and remain the same in all iterations. Or, the dithered quantizer function can change between iterations, e.g., by changing the dithering values d.

Finally, the machine learning tool outputs the parameters of the machine learning model.

The innovations described herein include, but are not limited to, the innovations covered by the claims. The innovations can be implemented as part of a method, as part of a computer system configured to perform the method, or as part of computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

FIGS. 5a-5c is a flowchart illustrating techniques for training a machine learning model using a machine learning tool, with dithered quantization of parameters.

DETAILED DESCRIPTION

Innovations in training with machine learning tools are described herein. For example, a machine learning tool uses dithered quantization of parameters during training of a machine learning model. In many cases, applying dithering during quantization of parameters can improve performance in various ways. For example, applying dithering during quantization of parameters can help reduce memory utilization during training a machine learning model, by enabling use of a lower-precision format to represent the parameters. Or, applying dithering during quantization of parameters can improve performance by reducing the time a machine learning tool takes to determine parameters during training, which potentially saves time and computing resources. Or, applying dithering during quantization of parameters can allow a machine learning tool to find parameters during training that more accurately classify examples during subsequent inference operations.

I. Example Computer Systems.

Figure 1:
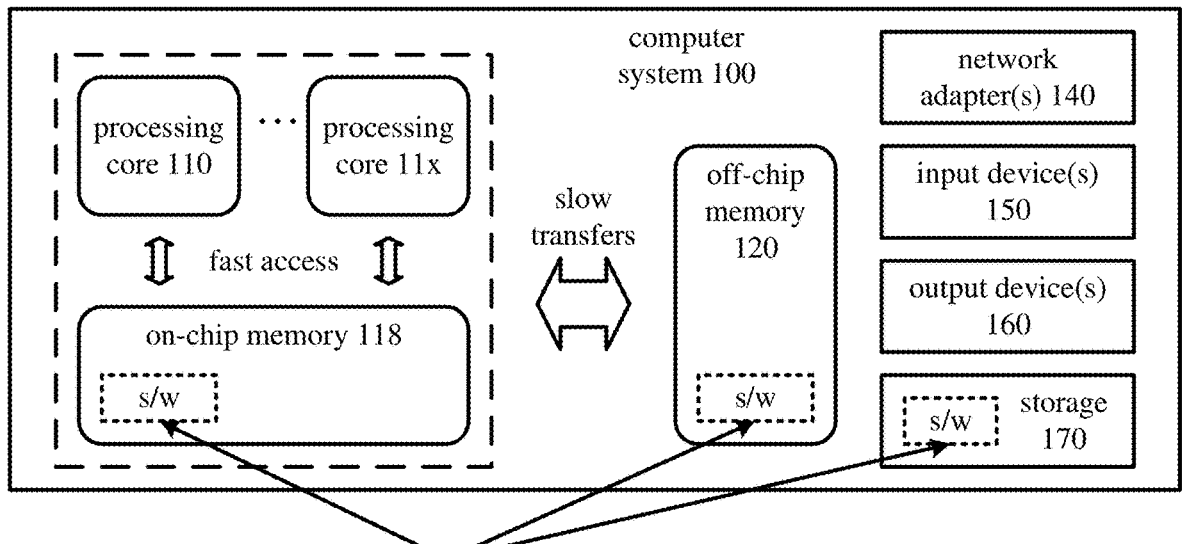
FIG. 1 is a block diagram illustrating an example computer system in which described embodiments can be implemented.

FIG. 1 illustrates a generalized example of a suitable computer system (100) in which several of the described innovations may be implemented. The innovations described herein relate to training with machine learning tools. Aside from its use in training with machine learning tools, the computer system (100) is not intended to suggest any limitation as to scope of use or functionality, as the innovations may be implemented in diverse computer systems, especially in special-purpose computer systems adapted for operations in training with machine learning tools.

With reference to FIG. 1, the computer system (100) includes one or more processing cores ($110 \ldots 11x$) of a processing unit and local, on-chip memory (118). The processing core(s) ($110 \ldots 11x$) execute computer-executable instructions. The number of processing core(s) ($110 \ldots 11x$) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) ($110 \ldots 11x$).

The local memory (118) can store software (180) implementing a machine learning tool that uses dithered quantization of parameters during training, for operations performed by the respective processing core(s) ($110 \ldots 11x$), in the form of computer-executable instructions. In FIG. 1, the local memory (118) is on-chip memory such as one or more caches, for which access operations, transfer operations, etc. with the processing core(s) ($110 \ldots 11x$) are fast. In particular, during training of a machine learning model, when parameters are buffered in the on-chip memory (118), the parameters can be quickly and efficiently accessed by the processing core(s) ($110 \ldots 11x$).

In some example implementations, the processing core(s) ($110 \ldots 11x$) are provided, along with associated memory (118), as part of a system-on-a-chip ("SoC"), application-specific integrated circuit ("ASIC"), field-programmable gate array ("FPGA"), or other integrated circuit that is configured to perform operations to train a machine learning model. The computer system (100) can also include processing cores (not shown) and local memory (not shown) of a central processing unit ("CPU") or graphics processing unit ("GPU"). In any case, the processing core(s) can execute computer-executable instructions for a machine learning tool that uses dithered quantization of parameters during training.

More generally, the term "processor" may refer generically to any device that can process computer-executable instructions and may include a microprocessor, microcontroller, programmable logic device, digital signal processor, and/or other computational device. A processor may be a CPU or other general-purpose unit, a GPU, or a special-purpose processor using, for example, an ASIC or FPGA. The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU), or by special-purpose hardware (e.g., in an ASIC).

The computer system (100) includes shared memory (120), which may be volatile memory (e.g., RAM), non-volatile memory (e.g., ROM, EEPROM, flash memory, etc.), or some combination of the two, accessible by the processing core(s) ($110 \ldots 11x$). The memory (120) stores software (180) implementing a machine learning tool that uses dithered quantization of parameters during training, for operations performed, in the form of computer-executable instructions. In FIG. 1, the shared memory (120) is off-chip memory, for which access operations, transfer operations, etc. with the processing cores are slower. In particular, during training of the machine learning model, if some of the parameters are "spilled" to the shared memory (120) because the local memory (118) cannot buffer all of the parameters, operations to transfer parameters to and from on-chip memory (118) for access or modification by the processing core(s) (110 . . . 11$x$) can add significant delay.

The computer system (100) includes one or more network adapters (140). As used herein, the term network adapter indicates any network interface card ("NIC"), network interface, network interface controller, or network interface device. The network adapter(s) (140) enable communication over a network to another computing entity (e.g., server, other computer system). The network can be a telephone network, wide area network, local area network, storage area network, or other network. The network adapter(s) (140) can support wired connections and/or wireless connections, for a telephone network, wide area network, local area network, storage area network, or other network. The network adapter(s) (140) convey data (such as computer-executable instructions, training data, or other data) in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). The computer system (100) can also include a video input, a microphone or other audio input, a motion sensor/tracker input, and/or a game controller input.

The computer system (100) includes one or more output devices (160) such as a display. The output device(s) (160) may also include a printer, CD-writer, video output, a speaker or other audio output, or another device that provides output from the computer system (100).

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing a machine learning tool that uses dithered quantization of parameters during training.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed computing device may be used to execute such software, it is also contemplated that hard-wired circuitry or custom hardware (e.g., an ASIC) may be used in place of, or in combination with, software instructions. Thus, examples are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, Digital Versatile Disc ("DVD"), any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. In general, usage of the ordinal numbers does not indicate any physical order or location, any ordering in time, any ranking in importance, quality, or otherwise, or any numerical limit to the features identified with the ordinal numbers. Similarly, an enumerated list of items does not imply that any or all of the items are mutually exclusive, unless expressly specified otherwise. Likewise, an enumerated list of items does not imply that any or all of the items are comprehensive of any category, unless expressly specified otherwise.

When a single device, component, module, or structure (generally, "component") is described, multiple components (whether or not they cooperate) may instead be used in place of the single component. Functionality that is described as being possessed by a single component may instead be possessed by multiple components, whether or not they cooperate. Similarly, where multiple components are described herein, whether or not they cooperate, a single component may instead be used in place of the multiple components. Functionality that is described as being possessed by multiple components may instead be possessed by a single component. In general, a computer system or component can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Components that are in communication with each other need not be in continuous communication with each other, unless expressly specified otherwise. On the contrary, such components need only transmit to each other as necessary or desirable, and may actually refrain from exchanging data most of the time. For example, a component in communication with another component via the Internet might not transmit data to the other component for weeks at a time. In addition, components that are in communication with each other may communicate directly or indirectly through one or more intermediaries.

As used herein, the term "send" denotes any way of conveying information from one component to another component. The term "receive" denotes any way of getting information at one component from another component. The components can be part of the same computer system or different computer systems. Information can be passed by value (e.g., as a parameter of a message or function call) or passed by reference (e.g., in a buffer). Depending on context, information can be communicated directly or be conveyed through one or more intermediate components. As used herein, the term "connected" denotes an operable communication link between components, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required. Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Machine Learning Tools.

Figure 2:
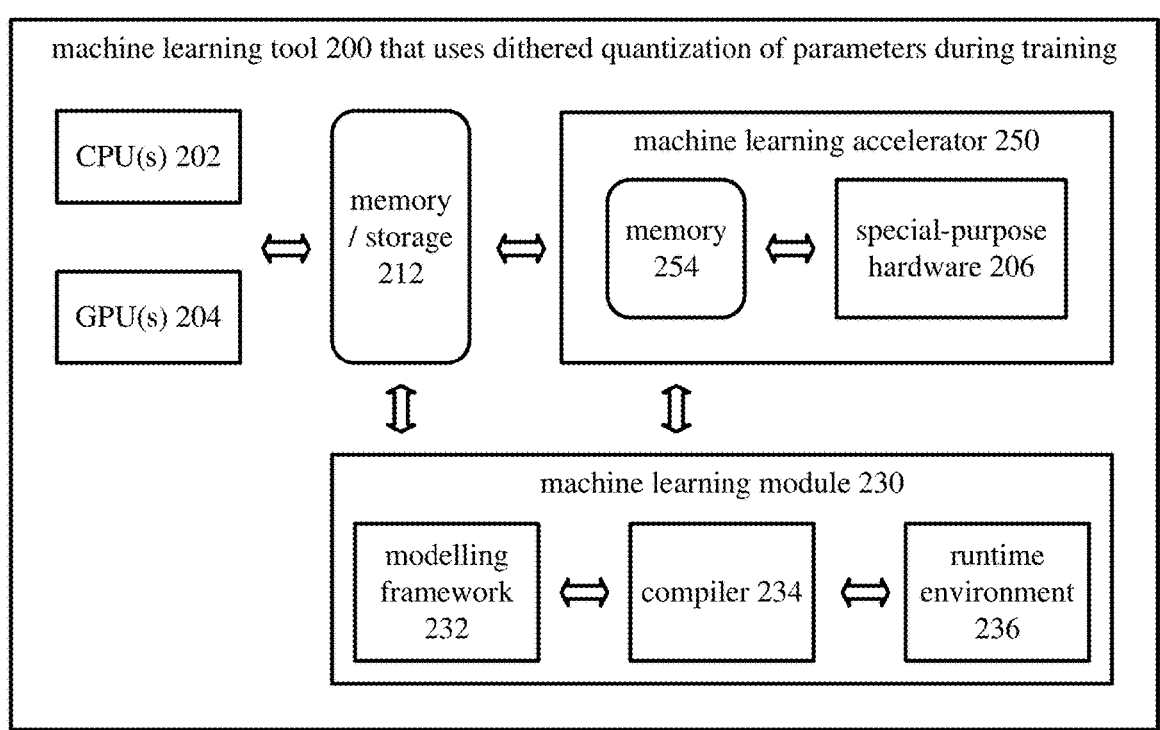
FIG. 2 is a block diagram illustrating an example machine learning tool, which is configured to use dithered quantization of parameters when training a machine learning model.

FIG. 2 shows an example machine learning tool (200), which is configured to use dithered quantization of parameters when training a machine learning model such as a deep neural network. The machine learning tool (200) uses a number of hardware resources, including one or more CPUs (202) coupled to memory/storage (212), which represents volatile memory, non-volatile memory, and/or persistent storage. The hardware resources can also include one or more GPUs (204) coupled to the memory/storage (212). The CPU(s) (202) (and possibly GPU(s) (204)) execute computer-executable instructions stored in the memory/storage (212) to provide a machine learning module (230).

The machine learning module (230) includes interfaces that allow the machine learning module (230) to be programmed to implement a machine learning model such as a neural network, a support vector machine, a Bayesian network, a decision tree, a linear classifier, or another type of machine learning model that uses supervised learning. For example, the machine learning module (230) can include one or more interfaces that allow the machine learning module (230) to be programmed to implement various types of neural networks. The interface(s) can include functions that allow an application or other client to define weights, biases, and activation functions for a neural network. The interface(s) can also include functions that allow an application or other client to define hyper-parameters such as the count of layers in a neural network and counts of nodes in the respective layers of a neural network. Additionally, functions can be exposed to allow an application or other client to define state elements for a recurrent neural network. The machine learning module (230) also includes one or more utilities for training of the machine learning model implemented with the machine learning module (230). As part of the training, the machine learning module (230) can use dithered quantization of parameters, as described in section V.

The machine learning module (230) can be implemented using proprietary libraries or frameworks and/or implemented using open-source libraries or frameworks. For example, for neural network creation, training, and evaluation, the libraries can include variations or extensions of TensorFlow, Microsoft Cognitive Toolkit ("CNTK"), Caffe, Theano, and Keras. In some example implementations, a programming tool such as an integrated development environment ("IDE") provides support for programmers and users to define, compile, and evaluate neural networks or other machine learning models.

The machine learning module (230) includes a modelling framework (232), compiler (234), and runtime environment (236), which provide a tool flow for specifying, training, and evaluating a machine learning model such as a neural network. In particular, the machine learning module (230) can be used to train parameters that represent a machine learning model. While the tool flow in the machine learning module (230) is described as having three separate components (232, 234, 236), the tool flow can have fewer or more components. For example, the three separate components (232, 234, 236) can be combined into a single modelling and execution environment.

Parameters representing a machine learning model can be stored in memory/storage (212) and operated on by instructions executed by the CPU(s) (202) and GPU(s) (204). For a neural network, for example, the parameters representing the neural network can include descriptions of nodes, connections between nodes, groupings, weights for connections between nodes, biases for nodes, and/or activation functions for nodes. Parameters representing a machine learning model can be specified in source code, executable code, metadata, configuration data, data structures and/or files. The parameters representing the machine learning model can be stored in a regular-precision format or, as explained below, in a lower-precision format.

The modelling framework (232) (also referred to as a native framework or a machine learning execution engine) is configured to define and use a machine learning model. In some example implementations, the modelling framework (232) includes pre-defined application programming interfaces ("APIs") and/or programming primitives that can be used to specify one or more aspects of the machine learning model. The pre-defined APIs can include both lower-level APIs (e.g., to set activation functions, cost or error functions, nodes, connections between nodes, and tensors for a neural network) and higher-level APIs (e.g., to define layers of a neural network, and so forth). Source code can be used, as an input to the modelling framework (232), to define a topology of a neural network or other machine learning model. In particular, in some example implementations, APIs of the modelling framework (232) can be instantiated and interconnected within the source code to specify a complex neural network.

The memory/storage (212) can store source code, metadata, data structures, files, etc. that define a machine learning model. In addition, the memory/storage (212) can store training data. In general, the training data includes a set of input data (examples) to be applied to the machine learning model, with a desired output (label) from the machine learning model for each respective dataset (example) of the input data in the training data.

The modelling framework (232) can be used to train a machine learning model with the training data. The training produces parameters associated with the machine learning model (e.g., weights associated with connections between nodes and biases associated with nodes of a neural network). After the machine learning model is trained, the modelling framework (232) can be used to classify new data that is applied to the trained machine learning model. Thus, the trained machine learning model, operating according to parameters obtained from training, can be used to perform classification tasks on data that has not been used to train the machine learning model.

The modelling framework (232) can use the CPU(s) (202) to execute a machine learning model. Alternatively, the modelling framework (232) can uses the GPU(s) (204) and/or machine learning accelerator (250) to execute a machine learning model with increased performance. The compiler (234) and runtime environment (236) provide an interface between the machine learning module (230) and the machine learning accelerator (250).

The compiler (234) is configured to analyze source code and training data (selected examples used to train the model) provided for a machine learning model, and to transform the machine learning model into a format that can be accelerated on the machine learning accelerator (250). For example, the compiler (234) is configured to transform the source code into executable code, metadata, configuration data, and/or data structures for representing the machine learning model. In some example implementations, the compiler (234) is configured to divide a neural network into portions using the CPU(s) (202) and/or the GPU(s) (204), and at least some of the portions (e.g., neural network subgraphs) can be executed on the accelerator (250). The compiler (234) can also be configured to generate executable code (e.g., runtime modules) for executing subgraphs of the neural network that are assigned to the CPU(s) (202) and for communicating with subgraphs assigned to the accelerator (250). The compiler (234) is configured to generate configuration data for the accelerator (250), which is used to configure accelerator resources to evaluate the neural network subgraphs assigned to the accelerator (250). The compiler (234) is further configured to create data structures for storing values generated by the neural network during execution and/or training, and for communication between the CPU(s) (202) and the accelerator (250). The compiler (234) can be configured to generate metadata that can be used to identify neural network subgraphs, edge groupings, training data, and various other information about the neural network during runtime. For example, the metadata can include information for interfacing between the different subgraphs of the neural network.

The runtime environment (236) is configured to provide an executable environment or an interpreter, which can be used to train a machine learning model during a training mode and can be used to evaluate the machine learning model in a training mode, inference mode, or classification mode. During the inference mode, input data can be applied to the machine learning model, and the input data can be classified in accordance with the training of the machine learning model. The input data can be archived data or real-time data. In some example implementations, the runtime environment (236) includes a deployment tool that, during a deployment mode, can be used to deploy or install all or a portion of the machine learning model to the accelerator (250). The runtime environment (236) can further include a scheduler that is configured to manage the execution of the different runtime modules and manage communication between the runtime modules and the accelerator (250). Thus, the runtime environment (236) can be used to control the flow of data between nodes modeled on the machine learning module (230) and the accelerator (250).

The machine learning accelerator (250) includes special-purpose hardware (206) for machine learning as well as local memory (254). The machine learning accelerator (250) can be implemented as an ASIC (e.g., including a system-on-chip ("SoC") integrated circuit), as an FPGA, or other reconfigurable logic. For example, the machine learning accelerator (250) can include a tensor processing unit ("TPU"), one or more reconfigurable logic devices, and/or one or more neural processing cores. Data (e.g., parameters for a machine learning model, training data) can be passed between the machine learning module (230) and the machine learning accelerator (250) using the memory/storage (212) or an input/output interface.

In some example implementations, the machine learning accelerator (250) includes one or more neural network subgraph accelerators, which are used to accelerate evaluation and/or training of a neural network (or subgraphs thereof) by increasing speed and reducing latency, compared to using only CPU(s) (202) and/or GPU(s) (204). A subgraph accelerator can be configured in hardware, software, or a combination of hardware and software. For example, a subgraph accelerator can be executed using instructions executable on a TPU. Or, as another example, a subgraph accelerator can be configured by programming reconfigurable logic blocks. Or, as another example, a subgraph accelerator can be configured using hard-wired logic gates of the machine learning accelerator (250).

In particular, a subgraph accelerator can be programmed to execute a subgraph for a layer or individual node of a neural network. The subgraph accelerator can access local memory (254), which stores parameters (e.g., weights, biases), input values, output values, and so forth. The subgraph accelerator can have multiple inputs, where each input can be weighted by a different weight value. For example, for a node, the subgraph accelerator can be configured to produce a dot product of an input tensor (input values on connections to the node) and programmed weights (for the respective connections to the node) for the subgraph accelerator. The dot product can be adjusted by a bias value (for the node) before it is used as an input to an activation function (e.g., sigmoid function) for the node. The output of the subgraph accelerator can be stored in the local memory (254). From the local memory (254), the output can be accessed by a different subgraph accelerator and/or transmitted to the memory/storage (212), where it can be accessed by the machine learning module (230). The machine learning accelerator (250) can include multiple subgraph accelerators, which are connected to each other via an interconnect mechanism.

In some example implementations, the machine learning accelerator (250) provides functionality to convert data represented in a regular-precision format (e.g., a full precision floating-point format) for the machine learning module (230) into quantized values in a lower-precision format. Example formats are described in section IV. The machine learning accelerator (250) performs at least some operations using the quantized values, which use less space in local memory (254). The machine learning accelerator (250) further provides functionality to convert data represented as quantized values in the lower-precision format to the regular-precision format, before the values are transmitted from the machine learning accelerator (250). Thus, the machine learning accelerator (250) is configured to receive regular-precision values from the machine learning module (230)

and return regular-precision values to the machine learning module (230), but subgraph accelerators within the accelerator (250) perform the bulk of their operations on quantized values in the lower-precision format. For example, subgraph accelerators can be configured to perform vector-vector operations, matrix-vector operations, matrix-matrix operations, and convolution operations using quantized values. Addition operations and other less computationally-intensive operations can be performed on regular-precision values or quantized values. The local memory (254), which is accessible to subgraph accelerators, stores quantized values in the lower-precision format, and the memory/storage (212) stores values in the regular-precision format.

III. Example Neural Networks.

Figure 3:
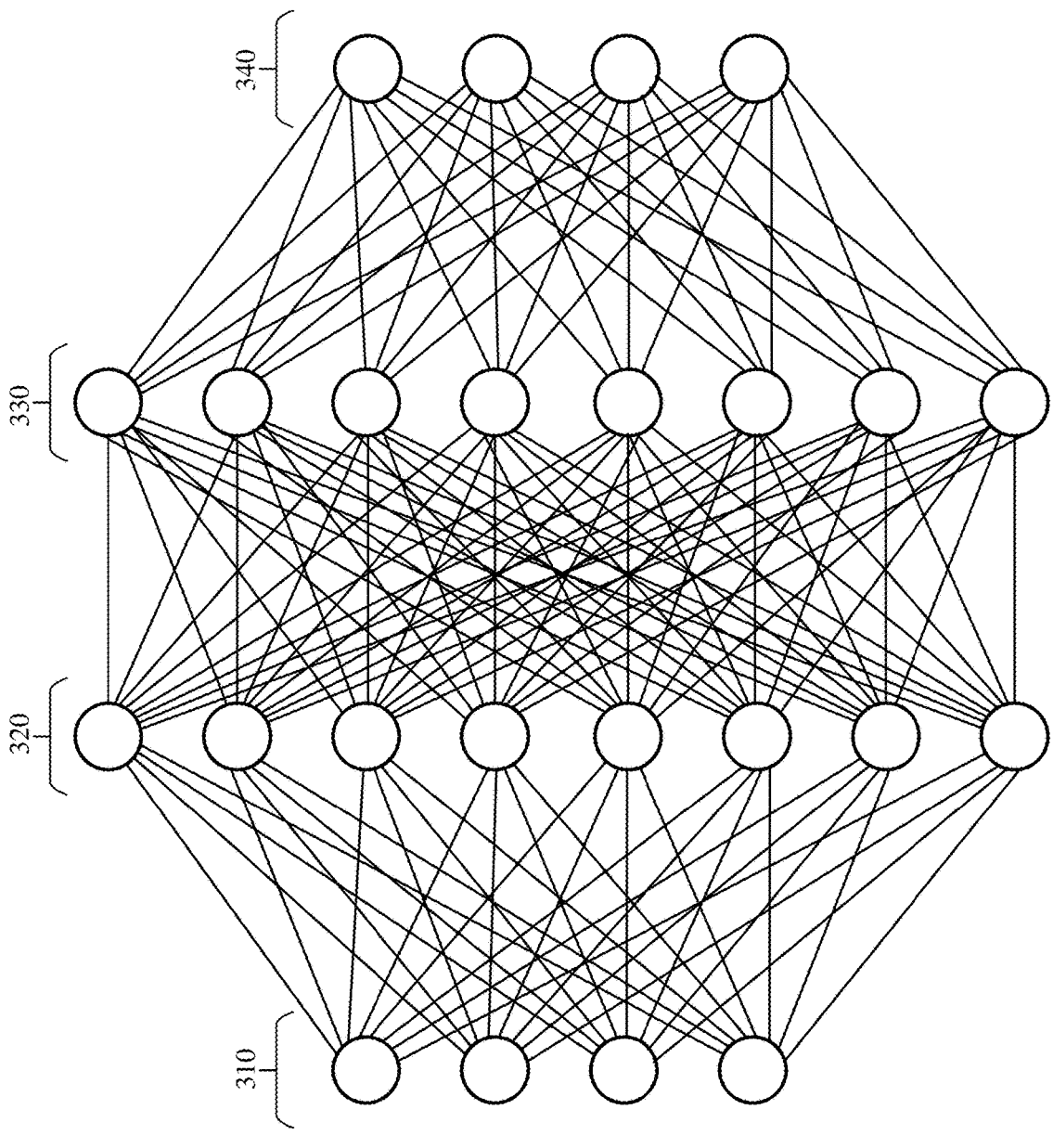
FIG. 3 is a diagram illustrating an example deep neural network.

FIG. 3 illustrates an example topology (300) of a deep neural network, which can be trained using dithered quantization of parameters. A machine learning tool (200) as described with reference to FIG. 2 can train the deep neural network. In some example implementations, one or more layers of the example topology (300) are implemented as subgraphs and processed using subgraph accelerators, as described in section II.

In general, a deep neural network operates in at least two different modes. The deep neural network is trained in a training mode and subsequently used as a classifier in an inference mode. During training, examples in a set of training data are applied as input to the deep neural network, and various parameters of the deep neural network are adjusted such that, at the completion of training, the deep neural network can be used as an effective classifier. Training proceeds in iterations, with each iteration using one example or multiple examples (a "mini-batch") of the training data. For an iteration, training typically includes performing forward propagation of the example(s) of the training data, calculating a loss (e.g., determining differences between the output of the deep neural network and the expected output for the example(s) of the training data), and performing backward propagation through the deep neural network to adjust parameters (e.g., weights and biases) of the deep neural network. When the parameters are adjusted, dithered quantization of parameters can be used as described in section V. When the parameters of the deep neural network are appropriate for classifying the training data, the parameters converge and the training process can complete. After training, the deep neural network can be used in the inference mode, in which one or more examples are applied as input to the deep neural network and forward propagated through the deep neural network, so that the example(s) can be classified by the deep neural network.

In the example topology (300) shown in FIG. 3, a first set (310) of nodes forms an input layer. A second set (320) of nodes forms a first hidden layer. A second hidden layer is formed from a third set (330) of nodes, and an output layer is formed from a fourth set (340) of nodes. More generally, a topology of a deep neural network can have more hidden layers. (A deep neural network conventionally has at least two hidden layers.) The input layer, hidden layers, and output layers can have more or fewer nodes than the example topology (300), and different layers can have the same count of nodes or different counts of nodes. Hyper-parameters such as the count of hidden layers and counts of nodes for the respective layers can define the overall topology.

A node of a given layer can provide an input to each of one or more nodes in a later layer, or less than all of the nodes in the later layer. In the example topology (300), each of the nodes of a given layer is fully interconnected to the nodes of each of the neighboring layer(s). For example, each node of the first set (310) of nodes (input layer) is connected to, and provides an input to, each node in the second set (320) of nodes (first hidden layer). Each node in the second set (320) of nodes (first hidden layer) is connected to, and provides an input to, each node of the third set (330) of nodes (second hidden layer). Finally, each node in the third set (330) of nodes (second hidden layer) is connected to, and provides an input to, each node of the fourth set (340) of nodes (output layer). Thus, a layer can include nodes that have common inputs with the other nodes of the layer and/or provide outputs to common destinations of the other nodes of the layer. More generally, a layer can include nodes that have a subset of common inputs with the other nodes of the layer and/or provide outputs to a subset of common destinations of the other nodes of the layer. Thus, a node of a given layer need not be interconnected to each and every node of a neighboring layer.

In general, during forward propagation, a node produces an output by applying a weight to each input from a preceding layer node and collecting the weighted input values to produce an output value. In some example implementations, each individual node can have an activation function and/or a bias applied. Generally, an appropriately programmed processor or FPGA can be configured to implement the nodes in the deep neural network. For example, for a node n of a hidden layer, a forward function $f( )$ can produce an output expressed mathematically as:

$$f(n) = \sigma\left(\sum_{i=0 \ to \ E-1} w_i x_i + b\right)$$

where the variable E is the count of connections (edges) that provide input to the node, the variable b is a bias value for the node n, the function $\sigma( )$ represents an activation function for the node n, and the variables $x_i$ and $w_i$ are an input value and weight value, respectively, for one of the connections from a preceding layer node. For each of the connections (edges) that provide input to the node n, the input value $x_i$ is multiplied by the weight value $w_i$. The products are added together, the bias value b is added to the sum of products, the resulting sum is input to the activation function $\sigma( )$. In some example implementations, the activation function $\sigma( )$ produces a continuous value (represented as a floating-point number) between 0 and 1. For example, the activation function is a sigmoid function. Alternatively, the activation function $\sigma( )$ produces a binary 1 or 0 value, depending on whether the summation is above or below a threshold.

A deep neural network can include thousands of individual nodes. Performing operations for nodes using values in a regular-precision format can be computationally expensive, compared to performing operations for nodes using values in a lower-precision format. Using values in a lower-precision format, however, can impede convergence on appropriate values for parameters during training due to parameter updates being ignored during quantization. Using dithered quantization of parameters can help a machine learning tool converge on appropriate values for parameters during training even when values are represented in a lower-precision format during training.

In some example implementations, a deep neural network is trained using a mix of values in a regular-precision format and values in a lower-precision format. For example, for a node n of a hidden layer, a forward function $f( )$ can produce an output expressed mathematically as:

$$f(n) = \sigma\left(Q^{-1}\left(\sum_{i=0 \ to \ E-1} Q(w_i)Q(x_i)\right) + b\right)$$

where $Q(w_i)$ is a quantized value of the weight in the lower-precision format, $Q(x_i)$ is a quantized input value in the lower-precision format, and $Q^{-1}( )$ is a de-quantized representation of its input (e.g., the quantized values of the dot product of the vectors w and x). In this case, computational complexity can potentially be reduced by performing the dot product using quantized values, and the accuracy of the output function can potentially be increased by (as compared with using only quantized values) by other operations using regular-precision values.

A neural network can be trained and retrained by adjusting constituent parameters of the output function $f(n)$. For example, by adjusting the weights $w_i$ and bias values b for the respective nodes, the behavior of the neural network is adjusted. A cost function C(w, b) can be used during back propagation to find suitable weights and biases for the network, where the cost function can be described mathematically as:

$$C(w, b) = \frac{1}{2m}\sum_{x} \|y(x) - a\|^2$$

where the variables w and b represent weights and biases, the variable m is the number of training inputs, and the variable a is a vector of output values from the neural network for an input vector y(x) of expected outputs (labels) from examples of training data. By adjusting the network weights and biases, the cost function C can be driven to a goal value (e.g., to zero) using various search techniques, such as stochastic gradient descent. The neural network is said to converge when the cost function C is driven to the goal value.

Similar to the forward function $f(n)$, the cost function can be implemented using mixed-precision computer arithmetic. For example, vector operations can be performed using quantized values and operations in the lower-precision format, and non-vector operations can be performed using regular-precision values.

A neural network can be trained for various usage scenarios. Such usage scenarios include, but are not limited to, image recognition, speech recognition, image classification, object detection, facial recognition or other biometric recognition, emotion detection, question-answer responses ("chatbots"), natural language processing, automated language translation, query processing in search engines, automatic content selection, analysis of email and other electronic documents, relationship management, biomedical informatics, identification or screening of candidate biomolecules, recommendation services, generative adversarial networks, or other classification tasks.

A neural network accelerator (e.g., as described with reference to FIG. 2) can be used to accelerate operations during training of a deep neural network. A deep neural network can be partitioned into different subgraphs that can be individually accelerated. In the example topology (300) of FIG. 3, for example, each of the sets of nodes (310, 320, 330, 340) for the respective layers can be partitioned into a separate subgraph, for which training operations are accelerated. Computationally-expensive operations for the layer can be performed using quantized values, and less-expensive operations for the layer can be performed using regular-precision values. Values can be passed from one layer to another layer using regular-precision values.

Although the example topology (300) of FIG. 3 is for a non-recurrent, deep neural network, the tools described herein can be used for other types of neural networks, including a recurrent neural network or other artificial neural network.

IV. Example Formats for Parameters.

With an integer format or fixed-point format, a number is represented using a sign and a magnitude, which may be combined into a single value. If a number is represented with n bits of precision, $2^n$ values are possible. For an unsigned integer format, the represented values may be integers in the range of 0 to $2^n-1$. For a signed integer format, the represented values may be in a range centered at zero, such as $-2^{n-1}$ . . . $2^{n-1}-1$. For a fixed-point format with n bits of precision, an integer value with n bits is multiplied by an (implicit) scaling factor. For example, if the fixed-point format has 8 bits of precision and has a scaling factor of $\frac{1}{128}$, the binary value 11100101 represents the number $11100101 \times 2^{-7}$, and the binary value 00010010 represents the number $00010010 \times 2^{-7}$. By adjusting the counts of bits used to represent magnitude values, integer and fixed-point formats can trade off precision and storage requirements.

A typical floating-point representation of a number consists of three parts: sign (s), exponent (e), and mantissa (m). The sign indicates if the number is positive or negative. The exponent and mantissa are used as in scientific notation:

$$Value = s \times m\lambda 2^e$$

Alternatively, the sign and mantissa can be combined as a signed mantissa value. In any case, a number is represented within the precision limits of the mantissa and range of the exponent. Since the exponent scales the mantissa by a power of 2, very large magnitudes of may be represented. The precision of the floating-point representation is determined by the precision of the mantissa. Typical floating-point representations use a mantissa of 10 bits (for float 16, or half-precision float), 24 bits (for float 32, or single-precision float), or 53 bits (for float 64, or double-precision float). An integer with magnitude greater than $2^{53}$ can be approximated in a float 64 floating-point format, but it will not be represented exactly because there are not enough bits in the mantissa. A similar effect can occur for arbitrarily small fractions, where the fraction is represented by bits of the mantissa that take on the value of negative powers of 2. Also, there are many fractions that cannot be exactly represented because they are irrational in a binary number system. More exact representations are possible, but they may require the mantissa to contain more bits. By adjusting the counts of bits used to represent mantissa values and exponent values, floating-point formats can trade off precision and storage requirements. The 10-bit (float 16), 24-bit (float 32), and 53-bit (float 64) mantissa limits are common compromises of mantissa storage requirements versus representation precision in general-purpose computers.

With a block floating-point format, a group of two or more floating-point numbers use a single shared exponent, with each number still having its own sign and mantissa. For example, the shared exponent is chosen to be the largest exponent of the original floating-point values. For the numbers in the group, mantissa values are shifted to match the shared, common exponent. In this way, all values of a vector, all values of a row of a matrix, all values of a column of a matrix, or all values of a matrix can share a common exponent. Alternatively, values in a block floating-point format may be unsigned.

The count of bits used to represent mantissa values can be adjusted to trade off precision and storage requirements. After shifting, some bits of a quantized mantissa may be lost if the shared exponent is different than the value's original floating-point exponent. In particular, to have numbers share an exponent while maintaining a high level of accuracy, the numbers should have close to the same magnitude, since differences in magnitude are expressed solely in the mantissa (due to the shared exponent). If the differences in magnitude are too great, the mantissa will overflow for a larger value or be zero ("underflow") for a smaller value. For a block floating-point format, the shared exponent for a group of numbers can be selected to be the largest exponent from among the original regular-precision numbers. Alternatively, the shared exponent may be selected in a different manner, for example, by selecting an exponent that is a mean or median of the regular-precision floating-point exponents, or by selecting an exponent to maximize dynamic range of values stored in the mantissas when their numbers are converted to the block floating-point format.

Traditionally, a neural network is trained and deployed using values in a single-precision floating-point format or other regular-precision floating point format, but a lower-precision format may be used to perform inference operations with minimal loss in accuracy. On specialized hardware, using a lower-precision format can greatly improve latency and throughput during training operations, especially if operations can be performed on integer values (e.g., for mantissa values or magnitude values). For example, values represented in a regular-precision format (e.g., a 16-bit floating-point format, 32-bit floating-point format, 64-bit floating-point format, or 80-bit floating-point format) can be converted to quantized values in a lower-precision format for matrix×matrix multiplication operations, matrix× vector multiplication operations, and convolution operations. In particular, neural network weights and activation values can be represented in a lower-precision format, with an acceptable level of error introduced. Examples of lower-precision formats include formats having a reduced bit width (including by reducing the number of bits used to represent a number's mantissa or exponent) and block floating-point formats where two or more numbers share the same single exponent. Thus, lowering the precision of a floating-point number can include reducing the number of bits used to represent the mantissa or exponent of the number. Or, lowering the precision of a floating-point number can include reducing the range of values that can be used to represent an exponent of the number, such as when multiple numbers share a common exponent. Similarly, increasing the precision of a floating-point number can include increasing the number of bits used to represent the mantissa or exponent of the number. Or, increasing the precision of a floating-point number can include increasing the range of values that can be used to represent an exponent of the number, such as when a number is separated from a group of numbers that shared a common exponent.

As used herein, the use of the term "element" herein refers to a member of a matrix or vector. The term "tensor" refers to a multi-dimensional array that can be used to represent properties of a neural network and includes one-dimensional vectors as well as two-dimensional, three-dimensional, four-dimensional, or larger dimension matrices. A "regular-precision format" is a number format that is natively supported by a native or virtual CPU. For example, the term "regular-precision floating-point format" refers to a floating-point format having a mantissa, exponent, and optionally a sign, which is natively supported by a native or virtual CPU. Examples of regular-precision floating-point formats include, but are not limited to, IEEE 754 standard formats such as 16-bit, 32-bit, 64-bit, or to other floating-point formats supported by a processor, such as Intel AVX, AVX2, IA32, and x86_64 80-bit floating-point formats. Converting a number from a higher-precision format to a lower-precision format may be referred to as quantizing the number. Conversely, converting a number from a lower-precision format to a higher-precision format may be referred to as de-quantizing the number. A "lower-precision format" is a number format that results from quantizing numbers in a regular-precision format, and is characterized by a reduction in the number of bits used to represent the number. Values in the lower-precision format may be termed quantized values. For example, a "lower-precision floating-point format" uses fewer bits to represent a mantissa and/or uses fewer bits to represent an exponent, or uses a shared exponent (for a block floating-point format), compared to a regular-precision floating-point format.

Figure 4:
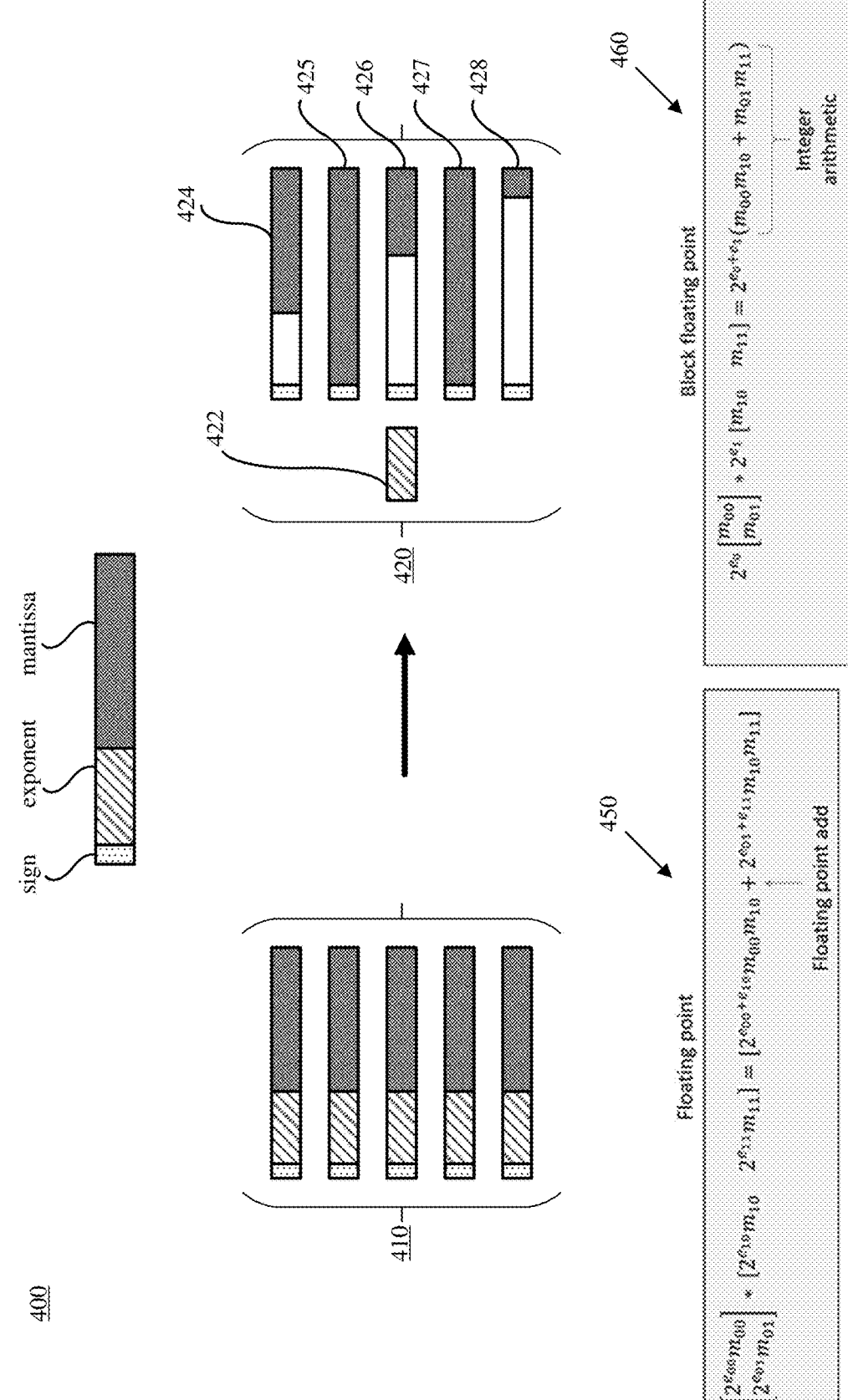
FIG. 4 is a diagram illustrating an example of conversion of values in a regular-precision floating-point format to values in a lower-precision floating-point format.

FIG. 4 illustrates an example (400) of conversion of numbers from a regular-precision floating-point format to a lower-precision floating-point format, which is a block floating-point format. Such conversion operations can be performed on values of input tensors (for examples of training data, for parameters) in a neural network.

As shown, a group of numbers (410) in a regular-precision floating-point format are represented. Each number includes a sign, an exponent with $e_1$ bits, and a mantissa with $m_1$ bits. For example, for IEEE 754 half-precision floating-point format, the sign is represented using one bit, the exponent is represented using 5 bits, and the mantissa is represented using 10 bits.

When the numbers (410) in the regular-precision floating-point format are converted to the block floating-point format, one exponent value having $e_2$ bits is shared by all of the numbers of the group. The group of numbers (420) in the block floating-point format are represented by a single exponent value (422), while each of the set of numbers includes a sign and a mantissa having $m_2$ bits. Since the numbers (410) in the regular-precision floating-point format have different exponent values, each number's respective mantissa may be shifted such that the same or a proximate number is represented in the lower-precision format, e.g., shifted mantissas 425-428. (In practice, the count of bits used to represent the values of the mantissa is the same for every number in the group—the shading in FIG. 4 represents shifting operations.)

Converting values to a lower-precision format can save memory. But even if the overall count of bits used to represent numbers in the lower-precision format is not reduced (e.g., because more bits are used for mantissa values, even if an exponent is shared), conversion to a block floating-point format can improve computational efficiency for certain common operations. For example, FIG. 4 shows a dot product of two floating-point vectors in a regular-precision floating-point format (450) and in the block floating-point format (460). For numbers represented in the regular-precision floating-point format (450), a floating-point addition is required to perform the dot product operation. The summation is performed in floating-point values, which can require shifts to align values with different exponents. In contrast, for numbers represented in the block floating-point format (460), the dot product can be calculated using integer addition to combine mantissa elements. More generally, since the exponent portion can be factored from each vector in the block floating-point format, multiplication and addition of the mantissas can be done entirely with fixed-point or integer representations of the mantissas. In this way, a large dynamic range for a set of numbers can be maintained with the shared exponent and shifted mantissa values, while reducing computational costs by using integer operations (instead of floating-point operations) on mantissa values. As a result, components (e.g., neural network subgraph accelerators) that process values in a lower-precision format can be made smaller and more efficient.

In some example implementations, computationally-expensive operations (such as vector-vector operations, vector-matrix operations, matrix-matrix operations, and convolution operations) are performed using quantized values and simple integer operations that the quantized values enable, while less computationally-expensive operations (such as scalar addition operations and scalar multiplication operations) can be performed using regular-precision values. For example, a neural network is partitioned into layers, and most of the training operations for a layer are performed using quantized values and simple integer operations. For example, such operations are performed in a machine learning accelerator (e.g., with subgraph accelerators). Less computationally-expensive operations for a layer (such as adding a bias value or calculating the result of an activation function) can be performed using regular-precision values. Thus, values that pass between layers can be in the regular-precision format. In particular, for a given layer, output values y from nodes, parameters w (e.g., weights for connections between nodes, biases for nodes), output error terms $\Delta y$ in backward propagation, and parameter update terms $\Delta w$ can be stored in regular-precision format. During forward propagation through a given layer, output values y from an earlier layer and parameters w can be converted from the regular-precision format to a lower-precision format, and output values y from the given layer can be converted from the lower-precision format back to the regular-precision format. During backward propagation through a given layer, the output error terms $\Delta y$ from a later layer can be converted from the regular-precision format to a lower-precision format, and the output error term $\Delta y$ from the given layer can be converted from the lower-precision format back to the regular-precision format.

V. Examples of Dithered Quantization of Parameters During Training with a Machine Learning Tool.

This section describes various innovations in training with machine learning tools using dithered quantization of parameters. For example, a machine learning tool uses dithered quantization of parameters during training of a machine learning model such as a neural network. Dithered quantization of parameters can improve performance in various ways. For example, applying dithering during quantization of parameters can help reduce memory utilization during training a machine learning model, by enabling use of a lower-precision format to represent the parameters. Or, applying dithering during quantization of parameters can improve performance by reducing the time a machine learning tool takes to determine parameters during training, which potentially saves time and computing resources. Or, applying dithering during quantization of parameters can allow a machine learning tool to find parameters during training that more accurately classify examples during subsequent inference operations.

A. Inefficiencies of Training without Dithered Quantization of Parameters.

Traditionally, a deep neural network is trained and deployed using values in a single-precision floating-point format or other regular-precision floating point format. A lower-precision format can be used during training. When using a lower-precision format to train a deep neural network, however, parameters of the deep neural network may become "trapped" in a non-optimal solution. Specifically, when training attempts to minimize an error function between output values from a neural network and expected output values, the training process may cease to update the parameters of the neural network after it reaches a solution that corresponds to a local minima of the error function, which prevents the training process from finding a better solution for the values of the parameters. In particular, the training process may cease to adjust parameters aggressively enough when updates to the parameters are consistently "ignored" due to quantization (e.g., from rounding or truncation) during training.

Updates to parameters may be "ignored," for example, for the following reason. When two numbers in a floating-point format (with m bits of precision for mantissa values) are added, the smaller one is typically converted to the scale of the larger one (same exponent), and the two mantissa values are added. Typically, the precision of the intermediate result (for the mantissa value) is increased. Then, the mantissa value for the result is quantized (e.g., using rounding or truncation) to the nearest value with m bits of precision. This quantization to the nearest value with m bits of precision can be the source of consistent, deterministic error when updates are small.

More formally, suppose parameters w for a machine learning model are updated between iterations during training as $w_{t+1} = Q(w_t + \Delta w_t)$, where the variable $w_t$ represents starting values of the respective parameters w for iteration t, the variable $\Delta w_t$ represents parameter updates to the respective parameters w for iteration t, and the variable $w_{t+1}$ represents final values of the parameters w for iteration t. (The variable $w_{t+1}$ may be output (final) values for the respective parameters w or starting values of the respective parameters w for the next iteration t+1.) Depending on implementation, the parameter updates $\Delta w_t$ may incorporate scaling by a learning rate. The function $Q(\ )$ represents a quantizer function, which quantizes an input (here, $w_t + \Delta w_t$) to the appropriate level of precision for the parameters w. Depending on implementation, the function $Q(\ )$ can use, for example, a simple rounding function or a floor (truncation) function. A simple rounding function round( ) rounds an input (here, $w_t + \Delta w_t$) to the closest "whole" value. A simple floor function floor( ) truncates an input (here, $w_t + \Delta w_t$) to the closest "whole" value in the direction of zero. More generally, quantization with the quantizer function $Q(\ )$ is performed with reference to a specified precision (bin width). For example, to quantize an input x to a precision p, the function $Q(\ )$ can be implemented as floor(x/p)×p or, alternatively, as round(x/p)×p, where p is a level of precision. (Without a precision p, the input x is in effect quantized to an integer by the rounding function or floor function.)

The limit of precision for the parameters w depends on the quantizer function $Q(\ )$. When parameter updates $\Delta w_t$ are small (in magnitude) relative to the limit of precision for the parameters w after the quantizer function $Q(\ )$ the parameter updates $\Delta w_t$ are consistently and deterministically "ignored" in the quantizer function $Q(\ )$ (e.g., due to rounding towards the starting values of the respective parameters $w_t$, or due to truncation of the parameter updates $\Delta w_t$ to return to the starting values of the respective parameters $w_t$). In an extreme case, the updated parameters ($w_t + \Delta w_t$) are always rounded or truncated by the quantizer function back to the starting values of the respective parameters $w_t$, and the parameters $w_t$ do not change. Even if some parameter updates $\Delta w_t$ are not ignored due to the quantizer function, however, the parameter updates $\Delta w_t$ may not be given enough weight in the aggregate, and the parameters $w_t$ are "under-adjusted."

For example, suppose a rounding function rounds down any fractional value 0.0<=x<0.5, and rounds up any fractional value 0.5<=x<1.0. Also suppose the distribution of values of the parameter updates $\Delta w_t$ is narrow. If the average value of the parameter updates $\Delta w_t$ is 0.1, most values of the parameter updates $\Delta w_t$ are ignored in the quantizer function. (Depending on the distribution of values and the average value for $\Delta w_t$, some parameters could change.) For the parameter updates $\Delta w_t$ to have an appropriate aggregate effect when the average value of the parameter updates $\Delta w_t$ is 0.1, roughly 10% of the values ($w_t + \Delta w_t$) should be rounded up and roughly 90% of the values ($w_t + \Delta w_t$) should be rounded down. Even if the average value of the parameter updates $\Delta w_t$ is 0.4, too many values $\Delta w_t$ are ignored. For the parameter updates $\Delta w_t$ to have an appropriate aggregate effect when the average value of the parameter updates $\Delta w_t$ is 0.4, roughly 40% of the values ($w_t + \Delta w_t$) should be rounded up and roughly 60% of the values ($w_t + \Delta w_t$) should be rounded down. More generally, consistently ignoring parameter update values causes the average update to deviate from the average desired update, and the adjustment of parameters $w_t$ is not aggressive enough.

In practice, in later iterations of training, as the average magnitude of parameter updates $\Delta w_t$ becomes small, the parameters w stop changing between iterations, and may be "trapped" in a non-optimal solution (e.g., because the parameter updates $\Delta w_t$ fail to perturb the parameters enough to escape a local minima). This can be a noticeable problem, especially if results of training using a low-precision format for values are compared to results of training using a high-precision format for values.

B. Principles of Dithered Quantization of Parameters During Training.

In general, dithering adds a randomly generated number to another quantity. One purpose of dithering is to decouple quantization error from a value being quantized, so that quantization error is de-correlated or "noisy." In quantization, precision is lost. If parameter updates are significantly smaller than quantizer precision, the parameter updates are consistently ignored, and quantized updated parameters are not sufficiently affected by the desired updates. In later iterations of training, a machine learning model may reach a point at which parameter updates are effectively nullified by quantization, which halts training short of its goal. By adding dithering, the expected values of quantized updated parameters can, in the aggregate, be made to approximately match the desired values for the updated parameters.

To apply dithering during quantization of parameters, a machine learning tool uses a random weighting factor during training of parameters. In many cases, when training attempts to minimize an error function between output values from a neural network and expected output values, the added random weighting factor can help push the neural network out of a non-optimal solution (e.g., local minima), so that a better solution can be found during training.

More formally, parameters w for a machine learning model are updated between iterations during training as $w_{t+1} = \text{dither}(w_t + \Delta w_t)$, where the variable $w_t$ represents starting values of the respective parameters w for iteration t, the variable $\Delta w_t$ represents parameter updates to the respective parameters w for iteration t, and the variable $w_{t+1}$ represents final values of the parameters w for iteration t. (The variable $w_{t+1}$ may be output (final) values for the respective parameters w or starting values of the respective parameters w for the next iteration t+1.) Depending on implementation, the parameter updates $\Delta w_t$ may incorporate scaling by a learning rate. The dithered quantizer function dither( ) adds random values to the updated parameters $(w_t+\Delta w_t)$ so as to mitigate consistent, deterministic errors during quantization (e.g., due to rounding, truncation) when the parameter updates $\Delta w_t$ are small (in magnitude) relative to the limit of precision for the parameters w after the quantizer function $Q$ ( ). With dithered quantization of parameters, even when the parameter updates $\Delta w_t$ are small in magnitude, the average desired updates reflected in the parameter updates $\Delta w_t$ can approximately be made to the parameters $w_t$.

Continuing the examples in the previous section, suppose a dithered quantizer function adds a dithering value d and then applies a rounding function. The rounding function rounds down any fractional value $0.0<=x<0.5$, and rounds up any fractional value $0.5<=x<1.0$. The dithering value d, which is independently selected for each parameter from a uniform distribution of values in the range of $-0.5<=d<0.5$, is added to the sum $(w_t+\Delta w_t)$ before rounding the result. If the average value of the parameter updates $\Delta w_t$ is 0.1, roughly 10% of the values $(w_t+\Delta w_t)$ are rounded up (when $0.4<=d<0.5$) and roughly 90% of the values $(w_t+\Delta w_t)$ are rounded down (when $-0.5<=d<0.4$). If the average value of the parameter updates $\Delta w_t$ is 0.4, roughly 40% of the values $(w_t+\Delta w_t)$ are rounded up (when $0.1\ d<0.5$) and roughly 60% of the values $(w_t+\Delta w_t)$ are rounded down (when $-0.5<=d<0.1$). Thus, the aggregate effect of the parameter updates $\Delta w_t$ approximates the average desired update to the parameters $w_t$.

Alternatively, a dithered quantizer function dither( ) can be implemented in some other way. For example, the dithered quantizer function dither( ) can be implemented by adding a dithering value d, which is independently selected for each parameter from a uniform distribution of values in the range of $0.0<=d<1.0$, to the sum $(w_t+\Delta w_t)$, then truncating the result according to a floor function. With this approach, the aggregate effect of the parameter updates $\Delta w_t$ still approximates the average desired update to the parameters $w_t$.

More generally, the dithered quantizer function adds a dithering value d before applying a quantizer function: $w_{t+1}=\text{quant}(w_t+\Delta w_t+d)$. As a result of the dithering, in the aggregate the expected values of the updated parameters $w_{t+1}$ equal the desired values for the updated parameters $w_{t+1}$. In other words, even if $w_t+\Delta w_t\ \text{quant}(w_t+\Delta w_t)$ due to consistent and deterministic quantization error, dithering mitigates the problem: $w_t+\Delta w_t=E(\text{quant}(w_t+\Delta w_t+d))$, where $E$( ) represents the expected value of its input.

In some example implementations, the parameter updates $\Delta w_t$ incorporate scaling by a learning rate which controls how aggressively the parameters $w_t$ are updated. For example, after the machine learning tool initially determines (unscaled) parameter updates $\Delta w'_t$ for the given iteration t, the parameter updates $\Delta w'_t$ are scaled by the learning rate $\eta$, as $\Delta w_t=\eta\times\Delta w'_t$. Typically, the learning rate has a value such as 0.1 or 0.2. Alternatively, the parameter updates $\Delta w_t$ do not incorporate any scaling by a learning rate $\eta$.

Examples of dithered quantizer functions are described below.

Although the benefits of dithered quantization of parameters may be most obvious in later iterations of training, as the average magnitude of parameter updates $\Delta w_t$ becomes smaller, dithered quantization of parameters typically does no harm in earlier iterations (when parameter updates $\Delta w_t$ are larger in magnitude). In earlier iterations, the dithered quantization of parameters acts as a (minor) additional source of randomness, and the training process already includes more significant sources of randomness (e.g., initial values for parameters; the order in which examples of training data are picked for training). As the average value of the parameter updates $\Delta w_t$ decreases in magnitude, dithered quantization of parameters can help parameters reach optimal values more quickly, since small magnitudes of parameter updates $\Delta w_t$ still cause appropriate changes, in the aggregate, to parameters w.

In summary, if training does not use dithered quantization of parameters, as the magnitude of parameter updates $\Delta w_t$ falls below the limit of precision of the parameters w after the quantizer function, the parameter updates $\Delta w_t$ are ignored (e.g., rounded away, truncated) too often. With dithered quantization of parameters, training works better because parameter updates $\Delta w_t$ still have an effect on parameters w after the quantizer function $Q$ ( ) at least some of the time. Performance improvements may be especially noticeable when training uses values in a lower-precision format, but the performance of training can improve even when training uses values in a regular-precision format, as the limits of precision are reached. Depending on implementation, dithered quantization of parameters can be used during training in which values (including parameters w) are represented in any format (especially a lower-precision format). During training, performance tends to improve as parameter updates $\Delta w$ decrease in magnitude past the limit of precision for the quantizer function $Q$ ( ) in later iterations. With dithered quantization of parameters, training that uses values in a lower-precision format often converges on a solution with parameters that are "just as good" as parameters found in training that uses values in a higher-precision format (but no dithered quantization of parameters). Similarly, whether values are represented in a regular-precision format or lower-precision format, training that uses dithered quantization of parameters can converge on a "better" solution (parameters that result in more accurate classification) than training without dithered quantization of parameters, or find a "comparable" solution (parameters that result in classification of similar accuracy) more quickly than training without dithered quantization of parameters.

In some typical usage scenarios, there are a large number of parameters (e.g., hundreds of millions of weights for connections between nodes of a neural network, and millions or tens millions of bias values for the nodes of the neural network). In some example implementations, values such as parameters are ideally stored in on-chip memory, which can be accessed quickly by processing cores during training operations. If values do not fit into memory, at least some of the values are "spilled" to slower, off-chip memory (e.g., DRAM). Transferring/swapping parameters between on-chip memory and off-chip memory can be expensive (slow) in terms of processing efficiency. In many cases, by using dithered quantization of parameters, a lower-precision format can be used for values (such as parameters) without hindering convergence on a solution.

C. Overview of Training Process with Dithered Quantization of Parameters.

A machine learning tool receives a set of training data. In general, the training data includes multiple examples. Each of the examples has one or more attributes of the example and a label (classification) for the example.

The machine learning tool initializes parameters of the machine learning model. For example, the machine learning tool sets the parameters of the machine learning model to random values. The parameters of the machine learning model depend on the type of machine learning model. If the machine learning model is a deep neural network, the parameters can include weights and biases. The weights are, for example, scalar values for connections between nodes of the deep neural network. The biases are, for example, scalar values for at least some nodes of the deep neural network. The parameters of the deep neural network can include other and/or additional parameters (e.g., hyper-parameters such as a count of layers in the deep neural network and, for each of the layers, a count of nodes in the layer; or control parameters such as beta and gamma parameters used in batch normalization). In typical configurations, some parameters (e.g., hyper-parameters defining number of layers and counts of nodes for the respective layers) are set before training. Other parameters (e.g., weight values for connections between nodes, biases for nodes) are determined through training. Examples of parameters for other types of machine learning models are described below.

The machine learning tool trains parameters based on the training data. As part of the training, the machine learning tool uses dithered quantization of parameters when it updates parameters. The dithered quantization of parameters can be implemented in various ways, as described below. In general, after the machine learning tool determines parameter updates for the respective parameters that are trained, the machine learning tool applies dithering values d associated with the respective parameters, before applying a quantizer function. When a parameter with a given level of precision is adjusted, the addition of the parameter update and dithering value d can be performed in intermediate calculations with values having higher precision than the given level of precision. The quantizer function returns the parameter to the given level of precision. Examples of dithering signals (dithering factors) and quantizer functions are described below.

After training, the machine learning tool outputs the parameters of the machine learning model. The parameters can then be used for classification (inference) or fed back to the machine learning tool for additional training of the machine learning mode.

With respect to timing, training of a machine learning model can be performed in one or more epochs. An epoch is a complete pass through a set of training data. For each epoch, a set of training data is processed in one or more iterations. The way that a set of training data is split for processing in different iterations depends on implementation.

For example, in a given iteration, a machine learning model can be trained using a single example from a set of training data. The single example can be randomly selected from among examples not yet used in the epoch. In the next iteration, another example is selected. Iterations continue for the epoch until all of the examples of the set of training data have been processed.

Alternatively, in a given iteration, a machine learning model can be trained using a batch ("mini-batch") of examples from a set of training data. The mini-batch can be randomly selected from among examples not yet used in the epoch. In the next iteration, another mini-batch of examples is selected. Iterations continue for the epoch until all of the examples of the set of training data have been processed. Mini-batches in different iterations can have the same size or different sizes.

Alternatively, a given iteration can use all of the examples in a set of training data.

In a given iteration, the machine learning tool forward propagates input values for selected example(s) through the machine learning model, using current values for parameters of the machine learning model. Then, the machine learning tool measures loss between the output values from the machine learning model (according to the current values for the parameters) and the expected values for the selected example(s). Based on the measured loss, the machine learning tool updates the parameters. For example, the machine learning tool backward propagates the measured loss through the machine learning model and determines parameter updates for the respective parameters, or determines parameter updates for the respective parameters in some other way. In any case, when the machine learning tool applies the parameter updates to the parameters, the machine learning tool uses a dithered quantizer function, which applies a dithering signal (dithering factor) before applying a quantizer function. The training process for a given iteration produces final weights for the given iteration, which may be starting weights for the next iteration.

Dithered quantization of parameters can be applied in all of the iteration(s) and can use the same dithering signal in each of the iteration(s). Alternatively, dithered quantization of parameters can change the dithering signal between at least some of the iteration(s) and/or not be applied in at least some of the iteration(s).

D. Usage Scenarios.

Dithered quantization of parameters can be used when training a machine learning model for use in various usage scenarios. Such usage scenarios include, but are not limited to, image recognition, speech recognition, image classification, object detection, facial recognition or other biometric recognition, emotion detection, question-answer responses, natural language processing, automated language translation, query processing in search engines, automatic content selection, analysis of email and other electronic documents, relationship management, biomedical informatics, identification or screening of candidate biomolecules, recommendation services, generative adversarial networks, or other classification tasks. For a given usage scenario, the training data includes examples appropriate for the given usage scenario—with attributes distinguishing different examples and descriptive labels for the usage scenario. Further, for a given usage scenario, hyper-parameters defining the machine learning model can be set or guided to enable accurate classification for the scenario.

E. Types of Machine Learning Models and Parameters Trained.

In general, dithered quantization of parameters can be used when training various types of machine learning models. For example, the machine learning model can be a neural network, a support vector machine, a Bayesian network, a decision tree, a linear classifier, or some other type of machine learning model that uses supervised learning.

If the machine learning model is a neural network, the neural network can be a deep neural network, which has an input layer, multiple hidden layers, and an output layer, or a shallow neural network. The neural network can be a non-recurrent neural network or recurrent neural network.

The parameters of the neural network whose values are set in training typically include weights for connections between nodes. The parameters of the neural network whose values are set in training can further include biases for nodes (that is, nodes of the hidden layer(s) and output layer). Other neural network parameters (e.g., activation functions for nodes, hyper-parameters that set a count of layers and/or counts of nodes for the respective layers, beta and/or gamma for batch normalization) can be defined before training begins. Alternatively, such other neural network parameters can have values set during training. Dithered quantization of parameters can be used when updating parameters of a neural network after backward propagation. Alternatively, dithered quantization of parameters can be used when updating parameters using some other approach (e.g., a gradient descent approach without backward propagation).

If the machine learning model is a support vector machine, the parameters of the support vector machine whose values are set in training typically include normal vector values for a hyperplane that separates input values. The parameters of the support vector machine whose values are set in training can further include an offset value for the hyperplane. Alternatively, the parameters of the support vector machine whose values are set in training can include one or more kernel parameters and a soft margin parameter. Other support vector machine parameters (e.g., kernel) can be defined before training begins. Alternatively, such other support vector machine parameters can have values set during training.

If the machine learning model is a Bayesian network, the parameters of the Bayesian network whose values are set in training typically include conditional probability distribution values for nodes. Other Bayesian network parameters (e.g., defining network structure) can be defined before training begins. Alternatively, such other Bayesian network parameters can have values set during training.

If the machine learning model is a decision tree, the parameters of the decision tree whose values are set in training typically include weights for outcomes of tests at the respective nodes of the decision tree. Other decision tree parameters (e.g., organization of nodes into levels, number of levels, tests at nodes) can be defined before training begins. Alternatively, such other decision tree parameters can have values set during training.

If the machine learning model is a linear classifier, the parameters of the linear classifier whose values are set in training typically include a vector of classifier weights that separate input values. Other linear classifier parameters can be defined before training begins. Alternatively, such other linear classifier parameters can have values set during training.

More generally, when training parameters of a machine learning model, dithered quantization of parameters can be used during training to update parameters appropriate for the machine learning model.

F. Examples of Dithering Signals.

The dithered quantizer function applied in dithered quantization of parameters uses a dithering signal (dithering factor), which provides a random weighting factor, or noise signal. The dithering signal depends on implementation.

In general, the dithering signal is based on a random function. The random function can be tied to the output of a random number generator ("RNG"), which can be implemented in hardware and/or software. The RNG can be integrated into a processor. The RNG is configured to be secure from unauthorized access, manipulation, or compromise. Generally, an output of the RNG is the basis on which dithering values are determined. The output of the RNG can include a random number or pseudorandom number (either is generally referred to as a "random number" or "random value"). For a set of parameters updated in an iteration, the dithering signal can be implemented as a vector of random values, which are added along with parameter updates to the parameters. The characteristics (e.g., range of values, distribution of values, spectral characteristics) of the random function can be pre-defined, or the characteristics of the random function can be set by a user.

Different dithering signals can be used for different types of parameters in training. For example, the dithering signal used to adjust weights for connections between nodes of a neural network can be different than the dithering signal used to adjust biases for the nodes of the neural network.

In general, dithering values d are independently determined for different parameters. Alternatively, a dithering signal can be structured among different parameters of the machine learning model. For example, instead of independently determining dithering values d for different parameters, dithering values d for different parameters could be correlated. Alternatively, dithering values d for different parameters could be anti-correlated.

In terms of range, the dithering signal has a range that depends on the dithered quantizer function. The dithered quantizer function can use a rounding function, which rounds its input value (e.g., mantissa value, magnitude value) to the nearest value at a given level of precision. In this case, the range of the dithering signal can be set to −0.5 to 0.5 of an increment of a value at the given level of precision. Or, if the dithering signal is defined using a Gaussian curve, the mean value of the dithering signal can be set to zero with a standard deviation of, e.g., 0.25. Alternatively, the dithered quantizer function can use a floor function, which truncates its input value (e.g., mantissa value, magnitude value) to the nearest value below the input value, at a given level of precision. In this case, the range of the dithering signal can be set 0.0 to 1.0 of an increment of a value at the given level of precision. Or, if the dithering signal is defined using a Gaussian curve, the mean value of the dithering signal can be set to 0.5 with a standard deviation of, e.g., 0.25.

In terms of distribution and spectral characteristics, over time the random function can produce random values that are uniformly distributed in a range (e.g., uniform in terms of distribution of amplitudes and in terms of distribution across frequencies). In some example implementations, the dithering signal applied by the dithered quantizer function is a white noise signal, which has a flat power spectrum across all frequencies when plotted as a function of frequency. Alternatively, instead of having a uniform distribution in terms of distribution of amplitudes and in terms of distribution across frequencies, the random values produced for the dithered quantizer function can have a non-uniform distribution of amplitudes and/or a non-uniform distribution across frequencies. For example, the dithering signal is a blue noise signal (having a sloped power spectrum when plotted as a function of frequency, with minimal low-frequency components and energy increasing with increasing frequency) or linear-shape noise signal having some other characteristic (e.g., Brownian noise, pink noise, violet noise). Alternatively, instead of having a power spectrum that has a linear slope, the random values produced for the dithering signal used in the dithered quantizer function can have a different shape, such as a bell-shaped (Gaussian) curve according to a Gaussian probability distribution function. In this case, a standard deviation can define the overall shape of the curve, and a mean value can define the center value of the curve. Alternatively, the random values that are produced by the random function can have some other distribution.

Parameter updates $\Delta w$ tend to decrease in magnitude in later iterations, as parameters w become more stable. As such, parameters w tend not to fluctuate wildly in later iterations, even if the dithering signal stays the same. In some example implementations, the dithering signal is the same in all iterations of training (e.g., a white noise signal for all iterations, with a randomly selected values in a range for each parameter update). Alternatively, the dithered quantizer function can change between iterations by using different dithering signals. In this case, the dithering signal can change shape, distribution, etc. in later iterations. For example, for a dithering signal that has a Gaussian distribution and is centered at zero, the standard deviation can change between iterations (e.g., decreasing in later iterations). Or, as another example, the "color" of noise for a dithering signal can change between iterations (e.g., with energy at higher frequencies increasing in later iterations).

Or, as another example, dithering values can be tracked between iterations to ensure that they are, collectively, random. Such approaches may use additional memory to track the values used for the dithered quantizer function. Approaches that use memory to make dithering values more "optimal" can improve dithering, but the added cost (memory utilization) may not be justified. As another example, error diffusion may be used to shape the spectrum of quantization error (e.g., instead of shaping the spectrum of the dithering signal). When adding dithering during quantization of parameters, error diffusion can be used to adjust parameters in ways that lead to more efficient exploration of options for the parameters, thereby leading to faster convergence during training.

The dithering signal can be applied in one iteration, in multiple iterations, or in all iterations for an epoch. Later iterations of a given epoch (or iterations of later epochs) can use a regular-precision format for parameters, with a dithered quantizer function no longer used to compensate for training with values in a lower-precision format. (Switching to the regular-precision format may avoid fluctuations in parameters, which otherwise may fail to stabilize during training with values in the lower-precision format.) Nevertheless, in some example implementations, training uses a dithered quantizer function (which applies the same dithering signal) and values in a lower-precision format in all iterations.

G. Examples of Dithering Operations.

The way that dithering values d are applied during dithered quantization of parameters can depend on the format used to represent parameters and depend on the dithered quantizer function.

A parameter can be in an integer format or fixed-point format with m bits of precision, or the parameter can be in a floating-point format with m bits of precision for the mantissa. During training, a parameter update and dithering value d can be applied in intermediate calculations, when the precision of intermediate values is increased. For example, if a parameter is represented in a 16-bit integer format, a 16-bit fixed-point format, or a floating-point format with a 16-bit mantissa, the precision of values in intermediate calculations during training can increase to 32 bits. As another example, if a parameter is represented in an 8-bit integer format, an 8-bit fixed-point format, or a floating-point format with an 8-bit mantissa, the precision of values in intermediate calculations during training can increase to 16 bits.

For a parameter in an integer format or fixed-point format, the parameter update and dithering value d are added to the parameter. For a parameter in a floating-point format, mantissa values for the parameter update and dithering value d are added to the mantissa value for the parameter. The mantissa values for the parameter and the parameter update are converted, if necessary, to have the same exponent, and the dithering value d is a floating-point number with the same exponent as the parameter and parameter update. After the parameter update and dithering value d are added to the parameter in the higher-precision intermediate calculations, the result is returned to m bits of precision by the quantizer function.

Suppose the dithered quantizer function uses a rounding function. The range of dithering values d is centered at zero, and a dithering value d can have a fractional value using additional bits of precision. For example, the range of dithering values d can extend from –0.5 to 0.5 of an increment for a value with m bits of precision, with the additional bits used to represent the fractional value. After the parameter update and dithering value d are added to the parameter in the higher-precision intermediate calculations, the result is rounded to a nearest value with m bits of precision by the quantizer function.

Or, suppose the dithered quantizer function uses a floor (truncation) function. The range of dithering values d is centered at 0.5, and a dithering value d can have a fractional value using additional bits of precision. For example, the range of dithering values d can extend from 0.0 to 1.0 of an increment for a value with m bits of precision, with the additional bits used to represent the fractional value. After the parameter update and dithering value d are added to the parameter in the higher-precision intermediate calculations, the result is truncated to a nearest lower value with m bits of precision by the quantizer function.

For example, suppose a value representing a parameter has 8 bits of precision (for an integer format, fixed-point format, or mantissa value of a floating-point format). To add a fractional update and fractional dithering value d, the mantissas of the parameter update and dithering value d can be shifted using eight additional bits of precision, so that the parameter update and the dithering value d have the same exponent as the parameter. If a parameter with an 8-bit mantissa value of 1100 1100 and exponent of five is added to a parameter update with an 8-bit mantissa value of 0101 1111 and exponent of –3, the mantissa value for the exponent is shifted to the same scale (exponent) as the parameter using additional bits of precision:

$$
\begin{array}{r}
1100\ 1100\ 0000\ 0000 \\
+0000\ 0000\ 0101\ 1111 \\
\hline
1100\ 1100\ 0101\ 1111
\end{array}
$$

In this example, if the values are added and the resulting value is truncated to a value with 8 bits of precision, the parameter update is ignored. The resulting value 1100 1100 0101 1111 is truncated to 1100 1100, which is the initial mantissa value for the parameter. In contrast, if a dithering value d in the range of 0.0 to 1.0 is added in the intermediate calculations, at the scale (exponent) of the parameter, and the resulting value is truncated to 8 bits, the parameter update might not be ignored. For example, the dithering value is 0000 0000 1110 0001. The three mantissa values are added.

$$
\begin{array}{r}
1100\ 1100\ 0000\ 0000 \\
+0000\ 0000\ 0101\ 1111 \\
+0000\ 0000\ 1110\ 0001 \\
\hline
1100\ 1101\ 0100\ 0000
\end{array}
$$

The resulting value 1100 1101 0100 0000 is truncated to a number with 8 bits of precision: 1100 1101. In this case, the addition of the dithering value d has caused the update to change the value of the parameter.

H. Formats of Parameters During Training.

Dithered quantization of parameters can be applied during training of parameters of a machine learning model regardless of the format used for values during training. Performance improvements may be especially noticeable when training uses values in a lower-precision format, since parameter updates $\Delta w$ more quickly decrease in magnitude past the limit of precision of the quantizer function when returning parameters to the format, but the performance of training can improve even when training uses values in a regular-precision format, as the limits of precision are reached.

For example, dithered quantization of parameters can be applied when values are in a regular-precision format for training operations. In this case, a dithering signal can be applied as dithering values in an intermediate, higher-precision format, with extended precision past the regular-precision format.

Or, as another example, dithered quantization of parameters can be applied when values have been converted to a lower-precision format for training operations. In this case, a dithering signal can be applied as dithering values in an intermediate, higher-precision format, with extended precision past the lower-precision format.

I. Example Techniques for Dithered Quantization of Parameters During Training.

FIG. 5a shows a generalized technique (501) for training a machine learning model using a machine learning tool, with dithered quantization of parameters. A machine learning tool as described with reference to FIG. 2, or another machine learning tool, can perform the technique (501).

The machine learning tool receives (510) training data. In general, the training data includes multiple examples. Each of the examples has one or more attributes and a label.

The machine learning tool initializes (520) parameters of the machine learning model. For example, the machine learning tool sets the parameters of the machine learning model to random values. Alternatively, the machine learning tool initially sets the parameters of the machine learning model in some other way.

The parameters of the machine learning model depend on the type of machine learning model. For example, if the machine learning model is a deep neural network having multiple layers, with each of the layers including one or more nodes, the parameters can include weights and biases. The weights are, for example, scalar values for connections between nodes of the deep neural network. The biases are, for example, scalar values for at least some nodes of the deep neural network. The parameters of the deep neural network can include other and/or additional parameters (e.g., hyperparameters such as a count of layers in the deep neural network and, for each of the layers, a count of nodes in the layer; or control parameters such as beta and gamma parameters used in batch normalization). Alternatively, the machine learning model is another type of neural network, a support vector machine, a Bayesian network, a decision tree, a linear classifier, or some other type of machine learning model that uses supervised learning, and the parameters include types of parameters appropriate for that type of machine learning model.

The machine learning tool trains (530) at least some of the parameters in one or more iterations based on the training data. As part of the training (530), the machine learning tool uses dithered quantization of parameters in at least one of the iteration(s). The dithered quantization of parameters can be applied in all of the iteration(s) and can be the same in each of the iteration(s). Alternatively, the dithered quantization of parameters can change between at least some of the iterations (e.g., changing the dithering signal) and/or not be applied in at least some of the iterations.

For a given iteration, the machine learning tool can randomly select a single example from among any remaining examples (not yet considered) of the training data. Or, for a given iteration, the machine learning tool can randomly select, as a mini-batch, multiple examples from among any remaining examples (not yet considered) of the training data. Or, for a given iteration, the machine learning tool can select all of the examples of the training data. In this way, the machine learning tool can process all of the examples of the training data.

The dithered quantization of parameters can be implemented in various ways. In general, for dithered quantization of parameters, the machine learning tool determines dithering values d associated with the respective parameters that are trained. The dithering values can be based at least in part on output of a random number generator. For example, the dithering values d can be random values output by the random number generator. The random values can have certain defined characteristics, which are set according to the random number generator or according to filtering of values. In some example implementations, the dithering values d are random values having the power spectrum of white noise, with a uniform distribution across a range in terms of frequency spectrum. Alternatively, the dithering values d can be random values having the power spectrum of blue noise or some other type of noise. Or, the dithering values d can be random values distributed according to a Gaussian curve.

In some example implementations, the parameters that are adjusted during training (530) are in a lower-precision format during at least some training operations. As part of the training (530), the machine learning tool can convert values (including parameters) from a first format to a second format, where the second format has a lower precision than the first format. For example, the first format is a floating-point format having $m_1$ bits of precision for mantissa values and $e_1$ bits of precision for exponent values, and the second format is a floating-point format having $m_2$ bits of precision for mantissa values and $e_2$ bits of precision for exponent values (where $m_1 > m_2$ and/or $e_1 > e_2$). Or, as another example, the first format is a floating-point format having $m_1$ bits of precision for mantissa values and $e_1$ bits of precision for exponent values, and the second format is a block floating-point format having a shared exponent value. Alternatively, the parameters can be in a regular-precision format throughout training.

The machine learning tool outputs (590) the parameters of the machine learning model.

FIG. 5b shows an example of operations (502) that can be performed during a given iteration of training (530). In the iteration, the machine learning tool applies (531) the machine learning model to at least some of the training data (that is, to one or more selected examples). Based at least in part on the results, the machine learning tool determines (532) parameter updates to the at least some of the parameters. For example, when the machine learning model is a deep neural network, the machine learning tool forward propagates input values for the iteration t through multiple layers of the neural network, calculates a measure of loss based on (a) output of the neural network after the forward propagation and (b) expected output for the at least some of the training data (that is, for the selected example(s)), and backward propagates the measure of loss through the multiple layers of the neural network. With reference to FIG. 5b, the machine learning tool updates (533) the at least some of the parameters, using the parameter updates and a dithered quantizer function. For example, the machine learning tool calculates final parameters $w_{t+1}$ for the iteration t based upon starting parameters $w_t$ for the iteration t and parameter updates $\Delta w_t$ in the iteration t, as $w_{t+1}$=dither($w_t$+$\Delta w_t$), where dither( ) is the dithered quantizer function. Parameters can be updated concurrently with backward propagation, on a layer-by-layer basis, or after backward propagation finishes for the iteration t. In some example implementations, the parameter updates $\Delta w_t$ incorporate scaling by a learning rate $\eta$. For example, the machine learning tool initially determines (unscaled) parameter updates $\Delta w'_t$ for the given iteration t, then scales the parameter updates $\Delta w'_t$ by the learning rate $\eta$, as $\Delta w_t$=$\eta \times \Delta w'_t$. Alternatively, the parameter updates $\Delta w_t$ do not incorporate any scaling by a learning rate $\eta$.

The dithered quantizer function can be implemented in various ways. For example, the dithered quantizer function can be implemented as round($w_t$+$\Delta w_t$+d), where round( ) is a rounding function, or round(($w_t$+$\Delta w_t$+d)/p)×p, where p is a level of precision. The variable d represents dithering values, which can be determined as described above. For the rounding function, if the parameters $w_t$ are in a format having a given level of precision after quantization is applied, the dithering values d can be selected in a range of −0.5 to 0.5 of an increment of a value at the given level of precision. For example, if the parameters $w_t$ are in a floating-point format having a given level of precision for mantissa values (e.g., 8 bits) after quantization is applied, the dithering values d associated with the parameters $w_t$, respectively, can be applied by adding mantissa values at a higher, intermediate level of precision (e.g., 16 bits) before rounding to a nearest mantissa value for the given level of precision (e.g., 8 bits). Or, if the parameters $w_t$ are in an integer format or fixed-point format having a given level of precision, the dithering values d associated with the parameters $w_t$, respectively, can be applied by adding values at a higher, intermediate level of precision before rounding to a nearest value at the given level of precision.

Alternatively, the dithered quantizer function can be implemented as floor($w_t$+$\Delta w_t$+d), where floor( ) is a floor function, or floor(($w_t$+$\Delta w_t$+d)/p)×p, where p is a level of precision. The variable d represents dithering values, which can be determined as described above. For the floor function, if the parameters $w_t$ are in a format having a given level of precision after quantization is applied, the dithering values d can be selected in a range of 0.0 to 1.0 of an increment of a value at the given level of precision. For example, if the parameters $w_t$ are in a floating-point format having a given level of precision for mantissa values (e.g., 8 bits), the dithering values d associated with the parameters $w_t$, respectively, can be applied by adding mantissa values at a higher, intermediate level of precision (e.g., 16 bits) before truncating to a nearest mantissa value for the given level of precision (e.g., 8 bits). Or, if the parameters $w_t$ are in an integer format or fixed-point format having a given level of precision, the dithering values d associated with the parameters $w_t$, respectively, can be applied by adding values at a higher, intermediate level of precision before truncating to a nearest value at the given level of precision.

Or, more generally, the dithered quantizer function can be implemented as quant($w_t$+$\Delta w_t$+d), where quant( ) is a quantizer, and the variable d represents dithering values, which can be determined as described above. For the quantizer function, there are a number of quantization bins that correspond to a given level of precision. The dithering values d associated with the parameters $w_t$, respectively, can be applied by adding values at a higher, intermediate level of precision before categorization in one of the quantization bins (quantization).

FIG. 5c shows a more detailed example of operations (503) that can be performed during training (530). In the operations (503) shown in FIG. 5c, the machine learning tool processes the training data in one or more complete passes (epochs) through the examples of training data. For each epoch, the machine learning tool processes the examples of the training data in one or more iterations. In the operations (503) shown in FIG. 5c, the machine learning model is a deep neural network.

To start, the machine learning tool gets (534) starting parameters for the next epoch. The parameters can include weights for connections between nodes of the neural network and/or bias values for nodes of the neural network. Alternatively, the parameters can include other and/or additional types of parameters.

For an initial iteration of an initial epoch, the starting parameters for the epoch can be set to random values or other initialized parameters for the machine learning model. For example, the parameters can be initialized to random regular-precision floating-point values. For an initial iteration of a subsequent epoch, the starting parameters for the epoch can be set to the final values of the parameters from an immediately previous epoch. For example, the parameters can be initialized to regular-precision floating-point values that were calculated from the immediately previous epoch.

The parameters can be stored in a buffer in memory of the machine learning tool. In some example implementations, the parameters are stored during training as quantized floating-point values in a lower-precision floating-point format, which can reduce the amount memory used for storing the parameters.

The machine learning tool selects (535) one or more examples of training data for the next iteration of the epoch. The machine learning tool can randomly select a single example from among any remaining examples of the training data (not yet considered in the epoch). Or, for the iteration, the machine learning tool can randomly select, as a mini-batch, multiple examples from among any remaining examples of the training data (not yet considered in the epoch). Or, for the iteration, the machine learning tool can select all of the examples of the training data. In different epochs, the machine learning tool can use the same training data (with examples selected in different orders and/or in different batches) or different training data.

The machine learning tool forward propagates (536) input values through each layer of the neural network. For the initial (input) layer of the neural network, the input values are based on the selected example(s) from the training data for an iteration t. After that, output values from a given layer of the neural network provide input values to the next layer of the neural network. The output function of the layer i in the iteration t can produce output $y_{t,i}$ that is described mathematically as:

$$y_{t,i} = f(y_{t,i-1}, w_{t,i})$$

where $y_{t,i-1}$ is the output from layer i–1 that provides input to layer i in iteration t, and $w_{t,i}$ is the parameters for the layer i in iteration t (e.g., weights for connections from nodes in layer i–1 to nodes in layer i, biases for nodes in layer i). Typically, the inputs, outputs, and parameters of the respective layers are vectors or matrices. Generally, the inputs, outputs, and parameters of the respective layers are tensors. As such, the parameters may be referred to as a weight tensor or parameter tensor. The function $f(\ )$ is a forward function (sometimes called a decision function) of the layer. For example, $f(y_{t,i-1}, w_{t,i}) = \text{activation}((\theta_{t,i})^T y_{t,i-1} + b_{t,i})$, where $\theta_{t,i}$ is the set of weights for connections from nodes in layer i–1 to nodes in layer i, $b_{t,i}$ is the set of biases for nodes in layer i, and activation( ) is an activation function such as the sigmoid function. In this way, values can be passed between the layers of the neural network, with output values from one layer providing input values to the next layer.

If training operations are performed using input values and parameters in a lower-precision format, the input values can nevertheless be passed between layers of the neural network in a regular-precision format. In this case, output function of the layer i can produce output $y_{t,i}$ that is described mathematically as:

$$y_{t,i} = Q^{-1}(f(Q(y_{t,i-1}), Q(w_{t,i})))$$

where the function $Q(\ )$ is a quantizer function, and function $Q^{-1}(\ )$ is a de-quantizer function. The quantizer function converts regular-precision values to quantized values (in the lower-precision format). The quantizer function can be selected to account for the type of input data and the types of operations performed by the layer i. The de-quantizer function converts quantized values to regular-precision values. Thus, the output function of the layer i is the de-quantized representation of the forward function $f(\ )$ In this way, values can be passed between the layers of the neural network, with output values from one layer providing input values to the next layer using regular-precision values.

As noted, the output function can include terms such as an activation function and/or the addition of bias values. If training operations are performed using values in a lower-precision format, additional terms can be applied as regular-precision values (after de-quantization) or using quantized values (before de-quantization).

After the forward propagation (536) of input values through the respective layers of the neural network, the machine learning tool calculates (537) loss of the neural network. For example, the final output $y_t$ of the neural network for the iteration t can be compared to an expected output $\hat{y}_t$ for the iteration t, which is based on the selected example(s) for the iteration t. Specifically, the expected output $\hat{y}_t$ can be based on labels in the training data for the selected example(s) for the iteration t. In general, the calculated loss quantifies the difference between the output $y_t$ of the neural network (after the forward propagation (536) of input values through the neural network) and the expected output $\hat{y}_t$.

The calculated loss is used as input to a cost function, which is calculated to update the parameters of the neural network. Specifically, the machine learning tool performs (538) backward propagation of the calculated loss through the neural network. In the backward propagation (538), an output error term $\Delta y_{t,i}$ and parameter update $\Delta w_{t,i}$ can be calculated at a layer i for the iteration t. The output error term $\Delta y_{t,i}$ at a layer i for the iteration t can be described mathematically as:

$$\Delta y_{t,i} = g(\Delta y_{t,i+1}, w_{t,i}),$$

where $\Delta y_{t,i+1}$ is the output error term going into layer i from layer i+1, and $w_{t,i}$ is the parameters for the layer i in iteration t (e.g., weights, biases). (From the output layer, the output error term $\Delta y_{t,i+1}$ can be the overall calculated loss.) The function g( ) is a backward function of the layer. Specifically, the backward function g( ) can be the backward function of the forward function $f(\ )$ for a gradient with respect to $y_{t,i}$ or a portion of the gradient function. The parameter updates $\Delta w'_{t,i}$ for the layer i in iteration t can be described mathematically as:

$$\Delta w'_{t,i} = h(y_{t,i}, \Delta y_{t,i+1}),$$

where $\Delta y_{t,i+1}$ is the output error term going into layer i from layer i+1 in iteration t, $y_{t,i}$ is the output for layer i in iteration t, and h( ) is a backward function of the layer. The backward function h( ) can be the backward function of the forward function $f(\ )$ for a gradient with respect to $w_{t,i}$ or a portion of the parameter update equation.

If training operations are performed using values and parameters in a lower-precision format, the error terms and parameters can nevertheless be passed between layers of the neural network in a regular-precision format. In this case, the output error term can be described mathematically as:

$$\Delta y_{t,i} = Q^{-1}(g(Q(\Delta y_{t,i+1}), Q(w_{t,i}))),$$

where $Q(\ )$ is a quantizer function, and $Q^{-1}(\ )$ is a de-quantizer function. Thus, the output error term of the layer can be the de-quantized representation of g( ). The parameter updates $\Delta w'_{t,i}$ can be described mathematically as:

$$\Delta w'_{t,i} = Q^{-1}(h(Q(y_{t,i}), Q(\Delta y_{t,i+1}))),$$

where $Q(\ )$ is a quantizer function, and $Q^{-1}(\ )$ is a de-quantizer function. Thus, the parameter update term of the layer can be the de-quantized representation of h( ) Additional terms can be applied using regular-precision values (after de-quantization) or using quantized values (before de-quantization).

After the backward propagation (or concurrently with the backward propagation), the machine learning tool updates (539) parameters for each layer of the neural network, using dithered quantization of the parameters. For example, the machine learning tool calculates parameters $w_{t+1,i}$ for layer i in the next iteration (iteration t+1) as:

$$w_{t+1,i} = \text{dither}(w_{t,i} + \eta \times \Delta w'_{t,i}),$$

where $w_{t,i}$ is the parameters for layer i in iteration t, $\eta$ is a learning rate (such as 0.1 or 0.2, which depends on implementation), and $\Delta w'_{t,i}$ is the (unscaled) parameter updates for layer i in iteration t. The learning rate can be the same for all layers and all iterations. Alternatively, the learning rate can change between layers and/or change between iterations. The dithered quantizer function dither( ) can be implemented as described above. When the parameters $w_{t,i}$ for layer i are updated, the parameters $w_{t,i}$ can be in a regular-precision format or lower-precision format.

The machine learning tool checks (540) whether the current iteration (iteration t) is the last iteration of the epoch. If not, the machine learning tool continues by selecting (535) one or more examples of training data for the next iteration (iteration t+1) of the epoch. If the machine learning tool has processed the last iteration of an epoch, the machine learning tool checks (541) whether to continue with another epoch. If so, the machine learning tool gets (534) starting parameters for the next epoch (e.g., the final values of the parameters from an immediately previous epoch) and continues training operations for the next epoch.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented in a computer system comprising at least one hardware processor and at least one memory coupled to the at least one hardware processor, the method comprising:

receiving training data;

initializing parameters of a machine learning model;

training at least some of the parameters in multiple iterations based on the training data, including, in each of the multiple iterations during the training:

applying the machine learning model to at least some of the training data;

based at least in part on results of the applying the machine learning model, determining a measure of loss as a difference between an output of the machine learning model for the at least some of the training data and an expected output of the machine learning model for the at least some of the training data;

based at least in part on the measure of loss for the at least some of the training data, determining a set of parameter updates to the at least some of the parameters;

combining predetermined respective dither values from a random value generator function with respective combinations of respective parameter updates of the set of parameter updates and respective starting parameter values of respective parameters of the at least some of the parameters used during the applying the machine learning model to at least some of the training data, wherein at least a portion of the respective predetermined dither values differ from one another, to provide respective quantizer function operands; and after the combining the predetermined respective dither values, quantizing the respective quantizer function operands using a quantizer function to provide one or more updated parameter values for at least a portion of the at least some of the parameters, wherein the one or more updated parameter values are used in at least one subsequent iteration of the multiple iterations.

2. The method of claim 1, wherein the machine learning model is a neural network having multiple layers, each of the multiple layers including one or more nodes, and wherein the parameters include one or more of:

weights for connections between the one or more nodes;

biases for at least some of the one or more nodes;

a count of the multiple layers;

for each of the multiple layers, a count of nodes in the layer; and a control parameter for batch normalization.

3. The method of claim 1, wherein the combining and the quantizing are implemented as, where $w_t$ is a starting parameter value, $\Delta w_t$ is a parameter update, and d is a dither value:

round($w_t+\Delta w_t+d$), wherein round( ) is a rounding function;

round(($w_t+\Delta w_t+d$)/p)×p, wherein p is a level of precision;

floor($w_t+\Delta w_t+d$), wherein floor( ) is a floor function;

floor(($w_t+\Delta w_t+d$)/p)×p, wherein p is a level of precision; or quant($w_t+\Delta w_t+d$), wherein quant( ) is a quantizer function.

4. The method of claim 1, wherein the at least some of the parameters are in a floating-point format having a given level of precision for mantissa values, and wherein the combining applies dithering values d associated with the at least some of the parameters, respectively, by adding mantissa values at a higher level of precision before rounding or truncating to a nearest mantissa value for the given level of precision.

5. The method of claim 1, wherein the at least some of the parameters are in an integer format or fixed-point format, and wherein the combining applies dithering values d associated with the at least some of the parameters, respectively, by adding values at a higher level of precision before rounding or truncating to a nearest integer value.

6. The method of claim 1, wherein the quantizing is implemented using a rounding function, wherein the at least some of the parameters are in a format having a given level of precision after quantization is applied, and wherein dithering values d for the combining are selected in a range of −0.5 to 0.5 of an increment of a value at the given level of precision after quantization.

7. The method of claim 1, wherein the quantizing is implemented using a floor function, wherein the at least some of the parameters are in a format having a given level of precision after quantization is applied, and wherein dithering values d for the combining are selected in a range of 0.0 to 1.0 of an increment of a value at the given level of precision after quantization.

8. The method of claim 1, wherein the determining the set of parameter updates, $\Delta w_t$, includes multiplying unscaled parameter updates $\Delta w'_t$ by a learning rate η, as $\Delta w_t=\eta \times \Delta w'_t$.

9. The method of claim 1, wherein the training the at least some of the parameters further includes:

converting values, including the at least some of the parameters, from a first format to a second format, the second format having a lower precision than the first format, wherein the first format is a first floating-point format having $m_1$ bits of precision for mantissa values and e1 bits of precision for exponent values, wherein the second format is a second floating-point format:

having $m_2$ bits of precision for mantissa values and $e_2$ bits of precision for exponent values, wherein $m_1>m_2$, and wherein $e_1>e_2$; or having a shared exponent value.

10. The method of claim 1, wherein the machine learning model is a deep neural network, a support vector machine, a Bayesian network, a decision tree, or a linear classifier.

11. The method of claim 1, wherein at least a portion of the respective dither values are based at least in part on output of a random number generator, and wherein the respective dither values are random values having a power spectrum of white noise or blue noise.

12. The method of claim 1, wherein the quantizer function is the same in each of the multiple iterations.

13. The method of claim 1, wherein the training data includes multiple examples, each of the multiple examples having one or more attributes and a label, and wherein each of the multiple iterations uses a single example or mini-batch of examples randomly selected from among any remaining examples, for an epoch, of the multiple examples.

14. The method of claim 1, wherein the initializing the parameters includes:

for an initial iteration of an initial epoch, setting the parameters to random values.

15. A computer system comprising:

a buffer, in memory of the computer system, configured to receive training data; and a machine learning tool, implemented with one or more processors of the computer system, configured to perform operations comprising:

initializing parameters of a machine learning model;

training at least some of the parameters in multiple iterations based on the training data, including, in each of the multiple iterations during the training:

applying the machine learning model to at least some of the training data;

based at least in part on results of the applying the machine learning model, determining a measure of loss as a difference between an output of the machine learning model for the at least some of the training data and an expected output of the machine learning model for the at least some of the training data;

based at least in part on the measure of loss for the at least some of the training data, determining a set of parameter updates to the at least some of the parameters;

combining predetermined respective dither values from a random value generator function with respective combinations of respective parameter updates of the set of parameter updates and respective starting parameter values of respective parameters of the at least some of the parameters used during the applying the machine learning model to at least some of the training data, wherein at least a portion of the respective predetermined dither values differ from one another, to provide respective quantizer function operands;

after the combining the predetermined respective dither values, quantizing the respective quantizer function operands using a quantizer function to provide one or more updated parameter values for at least a portion of the at least some of the parameters, wherein the one or more updated parameter values are used in at least one subsequent iteration of training of the machine learning model; and a buffer, in memory of the computer system, configured to store the parameters.

16. One or more computer-readable media having stored thereon computer-executable instructions for causing one or more processing units, when programmed thereby, to perform operations comprising:

receiving training data;

initializing parameters of a machine learning model;

training at least some of the parameters in multiple iterations based on the training data, including, in each of the multiple iterations during the training:

applying the machine learning model to at least some of the training data;

based at least in part on results of the applying the machine learning model, determining a measure of loss as a difference between an output of the machine learning model for the at least some of the training data and an expected output of the machine learning model for the at least some of the training data;

based at least in part on the measure of loss for the at least some of the training data, determining a set of parameter updates to the at least some of the parameters;

combining predetermined respective dither values from a random value generator function with respective combinations of respective parameter updates of the set of parameter updates and respective starting parameter values of respective parameters of the at least some of the parameters used during the applying the machine learning model to at least some of the training data, wherein at least a portion of the respective predetermined dither values differ from one another, to provide respective quantizer function operands; and after the combining the predetermined respective dither values, quantizing the respective quantizer function operands using a quantizer function to provide one or more updated parameter values for at least a portion of the at least some of the parameters, wherein the one or more updated parameter values are used in at least one subsequent iteration of training of the machine learning model.

17. The method of claim 1, wherein (1) the quantizer function is different between at least a portion of the multiple iterations, or (2) the quantizer function is not applied during one or more iterations of the multiple iterations.

18. The computer system of claim 15, wherein (1) the dithered quantizer function is different between at least a portion of the multiple iterations, or (2) the dithered quantization function is not applied during one or more iterations of the multiple iterations.

19. The one or more computer-readable storage media of claim 16, wherein (1) the dithered quantizer function is different between at least a portion of the multiple iterations, or (2) the dithered quantization function is not applied during one or more iterations of the multiple iterations.

20. The method of claim 1, wherein the at least a portion of the respective dither values are independently selected.

* * * * *